(12) United States Patent
Uehara et al.

(10) Patent No.: US 7,777,834 B2
(45) Date of Patent: Aug. 17, 2010

(54) LIGHT SOURCE DEVICE, DISPLAY DEVICE, TERMINAL DEVICE, LIGHT SOURCE UNIT, AND METHOD FOR DRIVING LIGHT SOURCE DEVICE

(75) Inventors: Shin-ichi Uehara, Tokyo (JP); Goroh Saitoh, Tokyo (JP)

(73) Assignees: NEC Corporation, Tokyo (JP); NEC LCD Technologies, Ltd., Kanagawa (JP)

( * ) Notice: Subject to any disclaimer, the term of this patent is extended or adjusted under 35 U.S.C. 154(b) by 1010 days.

(21) Appl. No.: 11/518,313

(22) Filed: Sep. 11, 2006

(65) Prior Publication Data

US 2007/0058108 A1 Mar. 15, 2007

(30) Foreign Application Priority Data

Sep. 14, 2005 (JP) ............................. 2005-266460

(51) Int. Cl.
*G02F 1/1335* (2006.01)
*F21V 7/04* (2006.01)
*G09G 3/34* (2006.01)

(52) U.S. Cl. ............................. 349/68; 349/64; 349/65; 349/69; 362/612; 362/613; 345/102

(58) Field of Classification Search .................. 349/64, 349/65, 68, 69; 362/612, 613; 345/102
See application file for complete search history.

(56) References Cited

U.S. PATENT DOCUMENTS 5,956,107 A * 9/1999 Hashimoto et al. ............ 349/64
6,646,636 B1 * 11/2003 Popovich et al. ............ 345/204

FOREIGN PATENT DOCUMENTS

| CN | 1651981 A | 8/2005 |
|---|---|---|
| JP | 05-072529 A | 3/1993 |
| JP | 9-105907 A | 4/1997 |
| JP | 09-244018 A | 9/1997 |

\* cited by examiner

*Primary Examiner*—Michael H Caley
(74) *Attorney, Agent, or Firm*—Sughrue Mion, PLLC

(57) ABSTRACT

In a display device, white LEDs and bluish white LEDs are arranged in alternating fashion on the light-incident surface side of a light-guide plate. On the light-exit side of the light-guide plate is disposed a transparent/scattering switching element switchable between a state of scattering incident light, and a state of transmitting light unchanged without scattering. During a narrow-angle display, only the white LEDs are lit, and the transparent/scattering switching element is placed in the transparent state, while during a wide-angle display, both the white LEDs and the bluish white LEDs are lit, and the transparent/scattering switching element is placed in the scattering state.

49 Claims, 28 Drawing Sheets

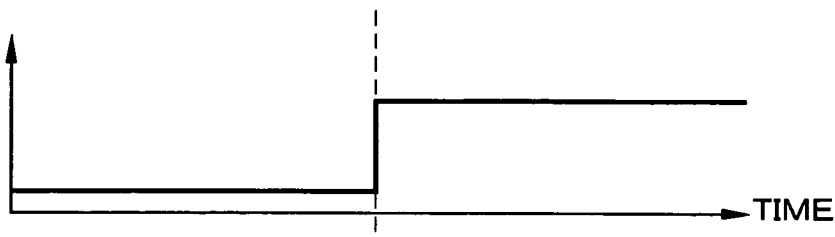
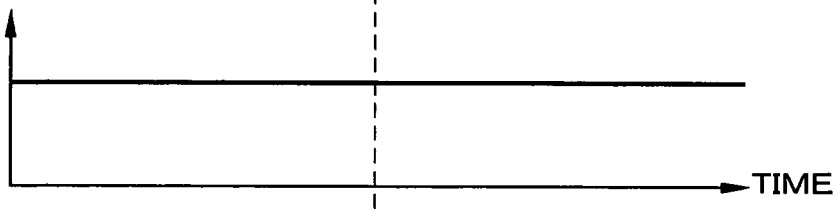
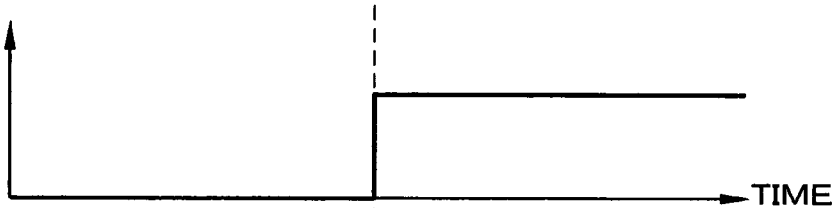
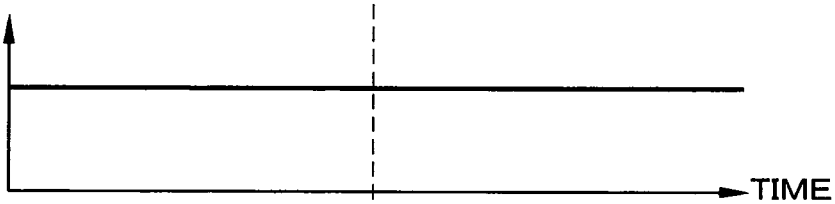
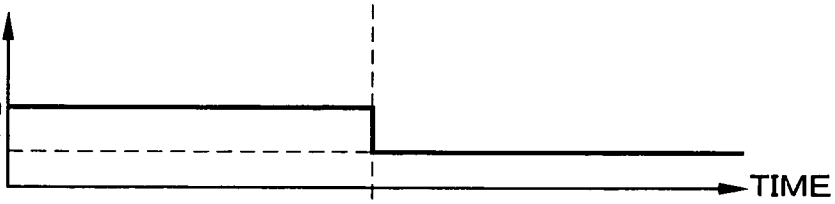
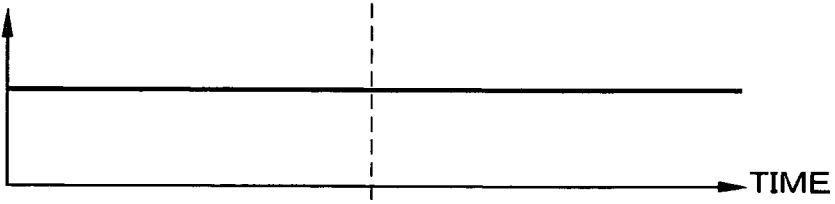
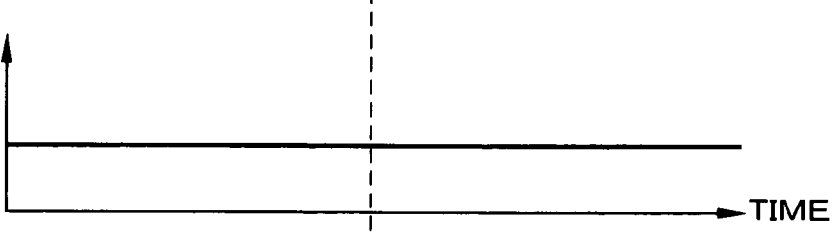

HAZE

LUMINOSITY

LUMINOSITY

LUMINANCE

CHROMATICITY
COORDINATES
x, y 0.29
0.26

LUMINANCE

CHROMATICITY
COORDINATES
x, y 0.30 t1

NARROW-ANGLE-DISPLAY  WIDE-ANGLE-DISPLAY

HAZE

LUMINOSITY

LUMINANCE

CHROMATICITY
COORDINATES
x, y 0.31
0.27

LUMINANCE

CHROMATICITY
COORDINATES
x, y 0.31

NARROW—ANGLE—DISPLAY  WIDE—ANGLE—DISPLAY

LIGHT SOURCE DEVICE, DISPLAY DEVICE, TERMINAL DEVICE, LIGHT SOURCE UNIT, AND METHOD FOR DRIVING LIGHT SOURCE DEVICE

BACKGROUND OF THE INVENTION

1. Field of the Invention

The present invention relates to a light source device capable of switching the radiation angle of illuminating light; to a display device provided with this light source device and capable of switching the viewing angle; to a terminal device equipped with this display device; to a light source unit incorporating the light source device; and to a method for driving the light source device.

2. Description of the Related Art

Because of their thin profile, light weight, small size, low energy consumption, and other advantages, display devices that use liquid crystals are currently deployed and used on a wide scale in a range of devices that includes monitors, televisions (TV), and other large terminal devices; notebook-type personal computers, cash dispensers, vending machines, and other mid-sized terminal devices; and personal TVs, PDAs (Personal Digital Assistance: personal information terminal), mobile phones, mobile gaming devices, and other small terminal devices. These liquid crystal display devices can be generally classified, according to the type of light source used, as transmissive, reflective, or transflective (using transmitted light and reflected light jointly). Energy consumption can be reduced in the reflective type, since external light can be utilized for display, but since contrast and other aspects of display performance are inferior compared to the transmissive type, transmissive and transflective liquid crystal display devices currently represent the mainstream. In transmissive and transflective liquid crystal display devices, a light source device is installed on the back surface of a liquid crystal panel, and a display is created using the light emitted from the light source device. Specifically, in current mainstream liquid crystal display devices, a light source device that is separate from the liquid crystal panel is essential.

In the liquid crystal panel that is the primary component of a liquid crystal display device, information is displayed by using an electric field to control the orientation of liquid crystal molecules, and numerous modes have been proposed according to the combination of the type and initial orientation of the liquid crystal molecules, the direction of the electric field, and other characteristics. Among these modes, the modes most often used in conventional terminal devices include an STN (Super Twisted Nematic) mode using a simple matrix structure, and a TN (Twisted Nematic) mode using an active matrix structure. However, liquid crystal panels that use these modes have a narrow angle range in which gradation can be correctly distinguished, and grayscale inversion occurs outside the optimum viewing position.

This problem of grayscale inversion was relatively insignificant in mobile phones and other terminal devices whose display content consists mainly of phone numbers and other text. However, with recent technological developments, terminal devices have come to display not only text information, but also large amounts of graphical information, and a resultant problem is that visibility of images is severely reduced by grayscale inversion. Liquid crystal panels that use a mode having a wide viewing angle range in which contrast can be correctly distinguished without the occurrence of grayscale inversion are therefore gradually being installed in terminal devices. Liquid crystal panels having this type of mode are referred to generically as wide-angle-view liquid crystal panels, and horizontal field modes such as IPS (In-Plane Switching) systems, multi-domain vertical alignment modes, and the like are implemented therein. Since gradation can be correctly distinguished over a wide viewing angle range by using these wide-angle-view liquid crystal panels, even though a medium-sized terminal device is basically a personal tool, applications for sharing information with others that can be appreciated by several people simultaneously are gradually being developed and installed.

On the other hand, the nature of medium-sized terminal devices is such that they are used not only in closed rooms under tight security, but also in public places. It then becomes important to keep display of private information and confidential information from being viewed by a third party. Particularly in recent years, occasions where private information and confidential information are displayed have increased in conjunction with progress in terminal devices, and demand for techniques to prevent surreptitious viewing is increasing. There accordingly exists a need to develop a technique capable of preventing surreptitious viewing and to enable the display to be viewed only by the user. This can be achieved by narrowing the angle range in which the display is visible, i.e., by narrowing the viewing angle range.

As described above, a display having a wide viewing angle range to allow viewing by several people simultaneously, and a display having a narrow viewing angle range that can be viewed only by the user, are both individually desirable, and the ability to switch between these two types of display in a single terminal device is also desirable. Therefore, in order to satisfy such requirements, there has been proposed a display device in which the light source device essential to the liquid crystal display device is designed so that the viewing angle range can be changed.

FIG. 1 is a schematic sectional view showing a first conventional viewing-angle-controlled liquid crystal display device described in Japanese Laid-open Patent Application No. 5-72529. As shown in FIG. 1, the first viewing-angle-controlled liquid crystal display device 1001 is composed of a liquid crystal element 1170 that is capable of controlling scattering; and a liquid crystal element 1180 that is capable of controlling optical rotation and double refraction properties. The liquid crystal element 1170 capable of controlling scattering is composed of substrates 1110 and 1111 that are optically transparent in the visible region, transparent electrodes 1120 and 1121, a scattering liquid crystal 1130, a voltage supply source 1100, and a switch 1190. The liquid crystal element 1180 capable of controlling optical rotation and double refraction properties is composed of substrates 1111 and 1112 that are optically transparent in the visible region, transparent electrodes 1122 and 1123, polarizers 1140 and 1141, orientation films 1150 and 1151, a liquid crystal layer 1160 having optical rotation and double refraction properties, a voltage supply source 1101, and a switch 1191. Polymer dispersed liquid crystal is used as the scattering liquid crystal 1130, and TN liquid crystal is used as the liquid crystal 1180 that is capable of controlling optical rotation and double refraction properties. The polarizers 1140 and 1141 are arranged as a crossed Nicol.

In the first viewing-angle-controlled liquid crystal display device configured in this way as described in Japanese Laid-open Patent Application No. 5-72529, a voltage is applied between the transparent electrodes 1122 and 1123, whereby the optical rotation and double refraction properties of the liquid crystal layer 1160 are changed, and this change can be used to control the transmittance of light. In this type of display mode that utilizes optical rotation and double refraction properties, the optical rotation and double refraction properties that substantially affect the incident light will differ according to the direction of the viewing angle. A phenomenon therefore occurs in which the luminance and chroma are reduced or inverted, depending on the viewing angle.

Accordingly, a liquid crystal element 1170 that can control scattering is disposed above this type of viewing-angle-dependent liquid crystal element 1180 to reduce viewing angle dependency. Specifically, since the liquid crystal molecules are randomly oriented in the absence of an electric field applied to the liquid crystal 1130 of the liquid crystal element 1170 that can control scattering, substantially isotropic scattering occurs over the entire viewing angle range, and a display can be obtained that has minimal dependency on the viewing angle. When an electric field is applied to the liquid crystal 1130, on the other hand, the liquid crystal molecules orient themselves substantially parallel to the applied electric field. The light emitted from the liquid crystal element 1180 exits without being scattered by the liquid crystal molecules. While visual characteristics are not improved and the viewing angle characteristics resemble those of a conventional TN liquid crystal in this case, it is possible for an image to be correctly recognizable only by a single user situated to the front of the screen. Consequently, when it is desirable that an image be correctly recognizable only by a single user situated to the front of the screen, surreptitious viewing by others can be prevented by not applying electrical current to the liquid crystal 1130.

FIG. 2 is a schematic sectional view showing a second conventional viewing-angle-controlled liquid crystal display device described in Japanese Laid-open Patent Application No. 9-244018; and FIG. 3 is a schematic perspective view showing the illumination device used in this viewing-angle-controlled liquid crystal display device. As shown in FIG. 2, the second conventional viewing-angle-controlled liquid crystal display device 2101 is composed of a liquid crystal display element 2102, a scatter control element (scatter control means) 2103, and an illumination device (backlight) 2104. The scatter control element 2103 is disposed between the liquid crystal display element 2102 and the illumination device 2104. As shown in FIG. 3, the illumination device 2104 is provided with an opaque slitted sheet (translucent sheet) 2120 and an irradiating unit 2121 disposed on the substrate side of the scatter control element 2103. A fluorescent tube or other light source 2122 is provided to the irradiating unit 2121, and a light emission surface 2123 for emitting the light from the light source 2122 and guiding the light to the opaque slitted sheet 2120 is formed. A reflecting sheet 2124 for reflecting the light emitted from the light source 2122 is provided in the irradiating unit 2121 on the surface facing the light emission surface 2123. In the opaque slitted sheet 2120, a large number of linear opaque members extending in one direction are arranged parallel to each other on one surface of a translucent sheet. The extension direction of the opaque members coincides with the vertical direction of the display screen.

In the second conventional viewing-angle-controlled liquid crystal display device configured as described in Japanese Laid-open Patent Application No. 9-244018, the light emitted from the light source 2122 exits from the light emission surface 2123 of the irradiating unit 2121, and is radiated to the scatter control element 2103 via the opaque slitted sheet 2120. When the light emitted from the light emission surface 2123 passes through the opaque slitted sheet 2120, the opaque slitted sheet 2120 blocks light incident from directions that are significantly inclined with respect to the light-incident surface of the opaque slitted sheet 2120. There is obtained thereby transmitted light that is highly parallel to the direction perpendicular to the plane of the opaque slitted sheet 2120. The light emitted from the illumination device 2104 then is incident on the scatter control element 2103. The scatter control element 2103 controls the scattering properties of incident light according to whether or not voltage is applied. When the scatter control element 2103 is in the scattering state, the light emitted from the illumination device 2104 is scattered by the scatter control element 2103, whereas when the scatter control element 2103 is in the transparent state, the light from the illumination device 2104 is not scattered.

In this second conventional viewing-angle-controlled liquid crystal display device 2101, highly collimated light emitted from the illumination device 2104 is scattered by the scatter control element 2103 and made incident on the liquid crystal display element 2102 when the scatter control element 2103 is in the scattering state. As a result, light that has passed through the liquid crystal display element 2102 escapes in all viewing angle directions of the display unit, and it becomes possible to discern display content from positions other than a position directly in front of the display unit. In contrast, when the scatter control element 2103 is in the transparent state, the highly collimated light from the illumination device 2104 enters the liquid crystal display element 2102 while still maintaining a high degree of collimation, since it is not scattered by the scatter control element 2103. As a result, light is not transmitted to locations from which the display unit is viewed diagonally to the left or right in the horizontal direction, so the screen appears dark, making it impossible to ascertain the displayed content. In other words, only an observer who is directly facing the display unit can ascertain the displayed content.

As described above, in this second conventional viewing-angle-controlled liquid crystal display device 2101, since scattering of the light can be controlled by the scatter control element 2103, the viewing angle characteristics of displayed content can be controlled. Furthermore, since highly collimated light can be directed towards the liquid crystal display element 2102 by the illumination device 2104, with the scatter control element 2103 in the transparent state, it is possible to reliably obtain viewing angle characteristics so that only an observer directly facing the display unit can ascertain the displayed content. Consequently, it is possible to obtain a liquid crystal display device that is capable of being switched at random between a state in which display characteristics are uniformly maintained in all viewing angle directions with negligible dependence of display characteristics on viewing angle, and a state in which displayed content can be ascertained only from a position directly facing the display unit.

However, the conventional viewing-angle-controlled liquid crystal display devices described above have problems such as the following. In the conventional viewing-angle-controlled liquid crystal display devices described above, the color of images changes when the viewing angle is switched. Particularly when a switch is made from a narrow viewing angle display having a narrow viewing angle range to a wide viewing angle display having a wide viewing angle range, images take on a yellowish hue, which can be unpleasant for the user.

SUMMARY OF THE INVENTION

An object of the present invention is to provide a light source device that enables switching of the radiation angle range, wherein the light source device can prevent change in color when the radiation angle range is switched; a display device with switchable radiation angle range equipped with this light source device; a terminal device in which this display device is installed; a light source unit incorporating the light source device; and a method of driving the light source device.

The light source device according to the present invention has a planar light source that emits light in planar form; a transparent/scattering switching element switchable between a transparent state in which light emitted from the planar light source is transmitted and a scattering state in which the light is scattered; and a control unit for controlling the planar light source and the transparent/scattering switching element; wherein during switching of the state of the transparent/scattering switching element, the control unit changes the chromaticity of light emitted from the planar light source, so as to reduce chromaticity change of light emitted from the transparent/scattering state switching element.

In the present invention, since the control unit changes the chromaticity of the light emitted from the planar light source when the transparent/scattering switching element transitions from the transparent state to the scattering state, it is possible to cancel out chromaticity change caused by frequency-dependence of the scattering characteristics of the transparent/scattering switching element. It is thereby possible to reduce chromaticity change of light emitted from the transparent/scattering switching element.

The control unit preferably controls the planar light source in such a way that the following Eqs. 1 to 3 are satisfied when the transparent/scattering switching element is switched, where the chromaticity coordinates of light emitted from the planar light source when the transparent/scattering switching element is brought to the transparent state are designated as (xt, yt), the chromaticity coordinates of light emitted from the transparent/scattering switching element are designated as (xpt, ypt), the chromaticity coordinates of light emitted from the transparent/scattering switching element when light having chromaticity coordinates (xt, yt) enters the transparent/scattering switching element while in the scattering state are designated as (xptd, yptd), the chromaticity coordinates of light emitted from the planar light source when the transparent/scattering switching element is in the scattering state are designated as (xd, yd), and the chromaticity coordinates of light emitted from the transparent/scattering switching element at this time are designated as (xpd, ypd).

$$(xptd-xpt) \times (xt-xd) > 0 \quad \text{[Eq. 1]}$$

$$(yptd-ypt) \times (yt-yd) > 0 \quad \text{[Eq. 2]}$$

$$(xptd-xpt)^2 + (yptd-ypt)^2 > (xpd-xpt)^2 + (ypd-ypt)^2 \quad \text{[Eq. 3]}$$

Additionally, the planar light source may have a first light source, and a second light source that emits light whose chromaticity coordinates are different from the chromaticity coordinates of the light emitted from the first light source; and the control unit may vary the proportion of the quantity of light emitted from the first light source and the quantity of light emitted from the second light source, so that when the transparent/scattering switching element is in the scattering state, this proportion is different from that in the transparent state.

At this time, the chromaticity coordinate values of light emitted from the second light source may be smaller than the chromaticity coordinate values of light emitted from the first light source; and the control unit, when the transparent/scattering switching element is switched from the transparent state to the scattering state, may increase the quantity of light of the second light source so that the proportion of change in the quantity of light of the second light source is greater than the proportion of change in the quantity of light of the first light source. By so doing, the second light source will emit light that is more bluish than the first light source, but since the transparent/scattering switching element in the scattering state scatters more of the short-wavelength component, the light emitted from the transparent/scattering switching element in the scattering state will maintain a white color close to that when in the transparent state.

Also, the first and second light sources are preferably light-emitting diodes. Light-emitting diodes are thinner than cold cathode fluorescent lamps, making it possible for the light source device to be thinner.

Each of the light-emitting diodes may have a blue light-emitting diode that emits blue light, and a yellow phosphor that emits yellow light by excitation with the blue light. By so doing, due to the high efficiency of the blue light-emitting diode, it is possible to increase luminance and reduce power consumption of the light source device.

Also, each light-emitting diode may have an ultraviolet light-emitting diode that emits ultraviolet light, a red phosphor that emits red light by excitation with the ultraviolet light, a green phosphor that emits green light by excitation with the ultraviolet light, and a blue phosphor that emits blue light by excitation with the ultraviolet light. By so doing, when the light source device is used as the backlight for a display device, vivid color can be displayed, and color rendering properties can be improved.

The quantity of light of the light-emitting diode is preferably adjusted by pulse modulation. It is thereby possible to adjust the quantity of light by adjusting the emission time proportions, so that fluctuation in white balance can be reduced.

The planar light source may have a light-guide plate for receiving light emitted from the first and second light sources, and emitting this light in planar form. There may be a plurality of first light sources and a plurality of second light sources arranged in alternating fashion. By so doing, a large number of light-emitting diodes can be placed in the planar light source, making it possible to increase the luminance of the light source device and reduce the occurrence of unevenness.

The first light sources are preferably connected to each other in series, and the second light sources are preferably connected to each other in series. Electrical current flowing to the plurality of first light-emitting diodes can thereby be made mutually equal, and electrical current flowing to the plurality of second light emitting diodes can be made mutually equal. As a result, variability in quantity of light caused by variability of internal impedance of the light-emitting diodes can be reduced.

Also, the number of first light sources and the number of second light sources are preferably equal to each other. By so doing, the driving voltages for the first and second light sources can be identical, and the design of the control unit can be simplified, thereby reducing cost, saving space, and improving reliability.

The wiring terminals of the first light sources and the wiring terminals of the second light sources may be partially shared.

A single first light source and a single second light source may be provided, and one corner of the light-guide plate may be cut off to form a single inclined surface, with the first and second light sources positioned at locations facing the inclined surface. It is thereby possible to reduce the occurrence of unevenness when a change is produced in the quantity of light of the first and second light sources.

The planar light source may have a first light-guide plate for receiving light emitted from the first light source and emitting this light in planar form; and a second light-guide plate which, when viewed from the first light-guide plate, is disposed on the transparent/scattering switching element side or on the opposite side therefrom, and which receives light emitted from the second light source and emits this light in planar form. The first light source and the second light source device, viewed in the direction looking toward the planar light source from the transparent/scattering switching element, are preferably positioned in the same mutual location relative to each other. The occurrence of unevenness can be reduced thereby.

Each of the first and second light sources may be a cold cathode fluorescent lamp. It is thereby possible to attain a high-efficiency light source device. Light source devices furnished with cold cathode fluorescent lamps are more appropriate for installation in terminal devices larger than medium ones, rather than in small mobile terminal devices, and when so installed can reduce change in color during viewing angle switching.

The first and second light sources may be housed in mutually different packages. By so doing, ordinary light-emitting diodes merely having different chromaticity coordinates can be used, making it possible to lower costs.

Additionally, the light source device may have a light direction regulating element for regulating a direction of light emitted from the planar light source and emitting the light to the transparent/scattering switching element. By so doing, the directivity of light emitted from the planar light source can be increased.

The display device according to the invention comprises the aforementioned light source device, and a transmissive display panel for transmitting light emitted from this light source device, and thus superimposes an image on this light.

In the present invention, since the radiation angle range of light can be switched using the light source device described above, the viewing angle of the display device can be switched.

The transmissive display panel may be a liquid crystal panel. The liquid crystal panel is preferably in a horizontal field mode, multi-domain vertical alignment mode, or film-compensated TN mode liquid crystal panel. It is thereby possible to reduce grayscale inversion in the display when the transparent/scattering switching element is in the scattering state, so that visibility is improved.

The terminal device according to the invention has the aforementioned display device. This terminal device may be a mobile phone, a personal information terminal, a gaming device, a digital camera, a video camera, a video player, a notebook-type personal computer, a cash dispenser, or a vending machine.

The light source unit according to the invention comprises a planar light source that emits light in planar form; and a transparent/scattering switching element switchable between a transparent state in which light emitted from the planar light source is transmitted and a scattering state in which the light is scattered; wherein during switching of the state of the transparent/scattering switching element, the chromaticity of light emitted from the planar light source is changed so as to reduce chromaticity change of light emitted from the transparent/scattering state switching element.

The method for driving a light source device according to the present invention comprises a transparent step for emitting first light by a planar light source that emits light in planar form, and switching to a transparent state a transparent/scattering switching element switchable between a transparent state in which light emitted from the planar light source is transmitted, and a scattering state in which the light is scattered; and a scattering step for causing the planar light source to emit second light whose chromaticity differs from the chromaticity of the first light, and switching the transparent/scattering switching element to the scattering state; wherein the chromaticity of the second light is set so as to reduce chromaticity change of light emitted from the transparent/scattering switching element during transition from the transparent step or the scattering step to the other.

EFFECT OF THE INVENTION

According to the present invention, in a light source device that permits switching of the radiation angle range, change in color during switching of the radiation angle can be reduced.

BRIEF DESCRIPTION OF THE DRAWINGS

FIGS. 11A through 11G are timing charts depicting operation when the display device according to the present embodiment is switched from a narrow-angle display to a wide-angle display, wherein time is plotted on the horizontal axis of each chart. FIG. 11A has the haze (HAZE: haze value) of the transparent/scattering state switching element plotted on the vertical axis, FIG. 11B has the emission luminosity of the white LED plotted on the vertical axis, FIG. 11C has the emission luminosity of the bluish white LED plotted on the vertical axis, FIG. 11D has the frontal luminance of light prior to entering the transparent/scattering switching element plotted on the vertical axis, FIG. 11E has the chromaticity coordinate (x, y) values of light prior to entering the transparent/scattering switching element plotted on the vertical axis, FIG. 11F has the frontal luminance of light after entering the transparent/scattering switching element plotted on the vertical axis, and FIG. 11G has the chromaticity coordinate (x, y) values of light after entering the transparent/scattering switching element plotted on the vertical axis;

FIG. 16A has the haze (HAZE: haze value) of the transparent/scattering state switching element plotted on the vertical axis, FIG. 16B has the emission luminosity of the white LED plotted on the vertical axis, FIG. 16C has the emission luminosity of the bluish white LED plotted on the vertical axis, FIG. 16D has the frontal luminance of light prior to entering the transparent/scattering switching element plotted on the vertical axis, FIG. 16E has the chromaticity coordinate (x, y) values of light prior to entering the transparent/scattering switching element plotted on the vertical axis, FIG. 16F has the frontal luminance of light after entering the transparent/scattering switching element plotted on the vertical axis, and FIG. 16G has the chromaticity coordinate (x, y) values of light after entering the transparent/scattering switching element plotted on the vertical axis;

FIG. 34A has the haze (HAZE: haze value) of the transparent/scattering state switching element plotted on the vertical axis, FIG. 34B has the emission luminosity of the white LED plotted on the vertical axis, FIG. 34C has the frontal luminance of light prior to entering the transparent/scattering switching element plotted on the vertical axis, FIG. 34D has the chromaticity coordinate (x, y) values of light prior to entering the transparent/scattering switching element plotted on the vertical axis, FIG. 34E has the frontal luminance of light after entering the transparent/scattering switching element plotted on the vertical axis, and FIG. 34F has the chromaticity coordinate (x, y) values of light after entering the transparent/scattering switching element plotted on the vertical axis.

DESCRIPTION OF THE PREFERRED EMBODIMENTS

Figure 1:
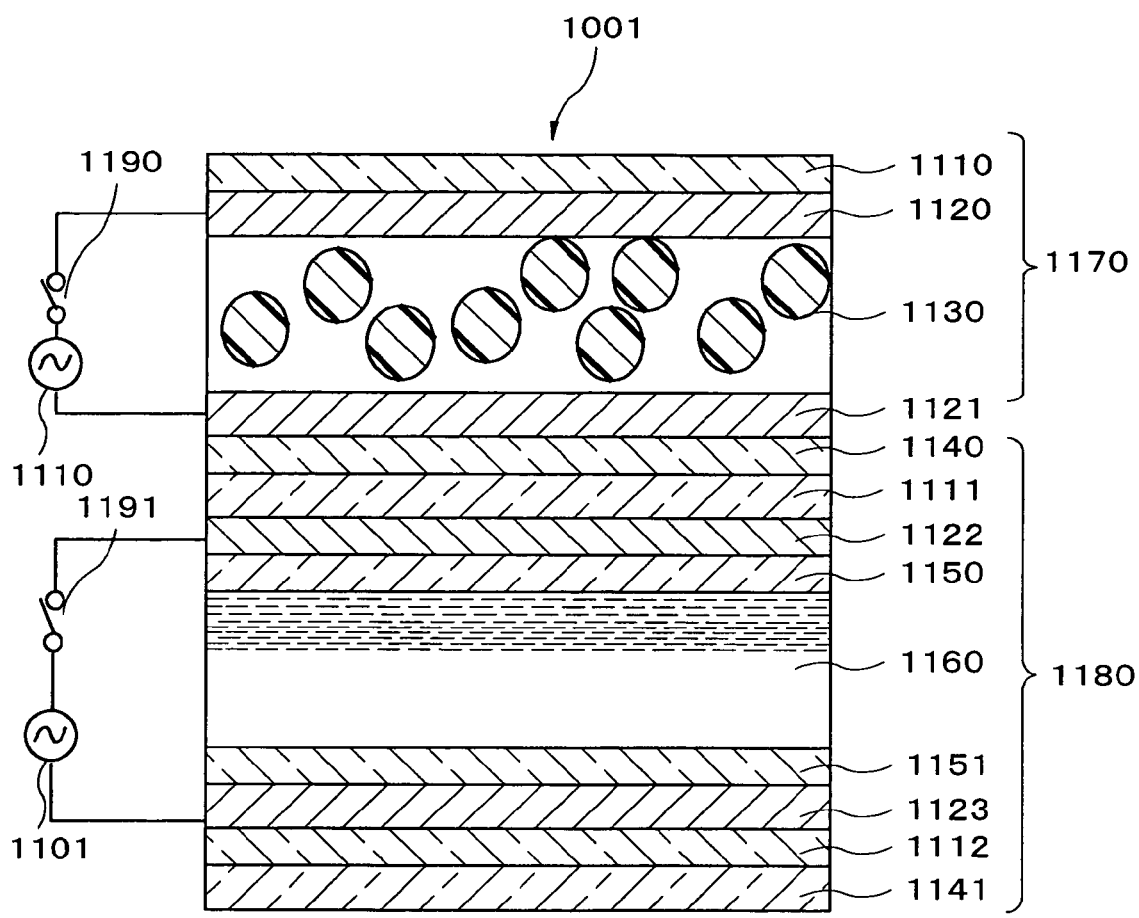
FIG. 1 is a schematic sectional view showing the first conventional viewing-angle-controlled liquid crystal display device disclosed in Japanese Laid-open Patent Application 5-72529.
Figure 2:
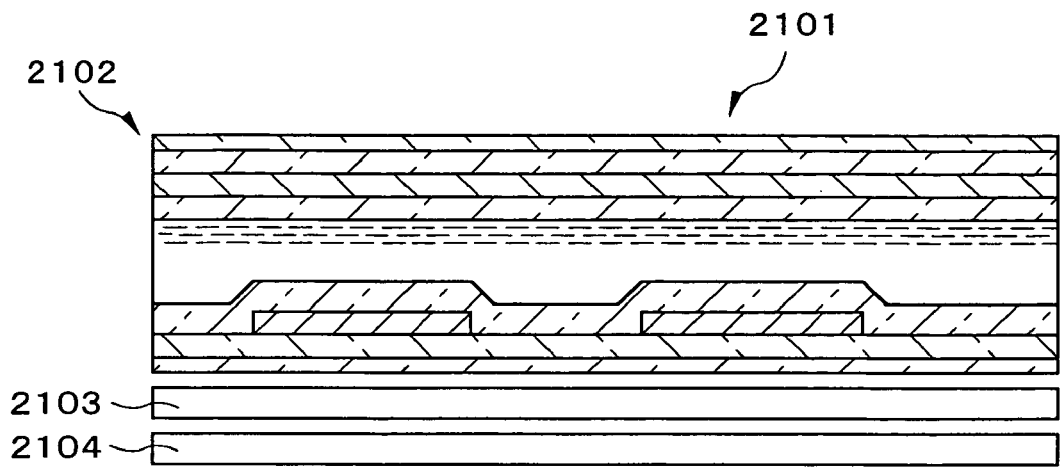
FIG. 2 is a schematic sectional view showing the first conventional viewing-angle-controlled liquid crystal display device disclosed in Japanese Laid-open Patent Application 9-244018.
Figure 3:
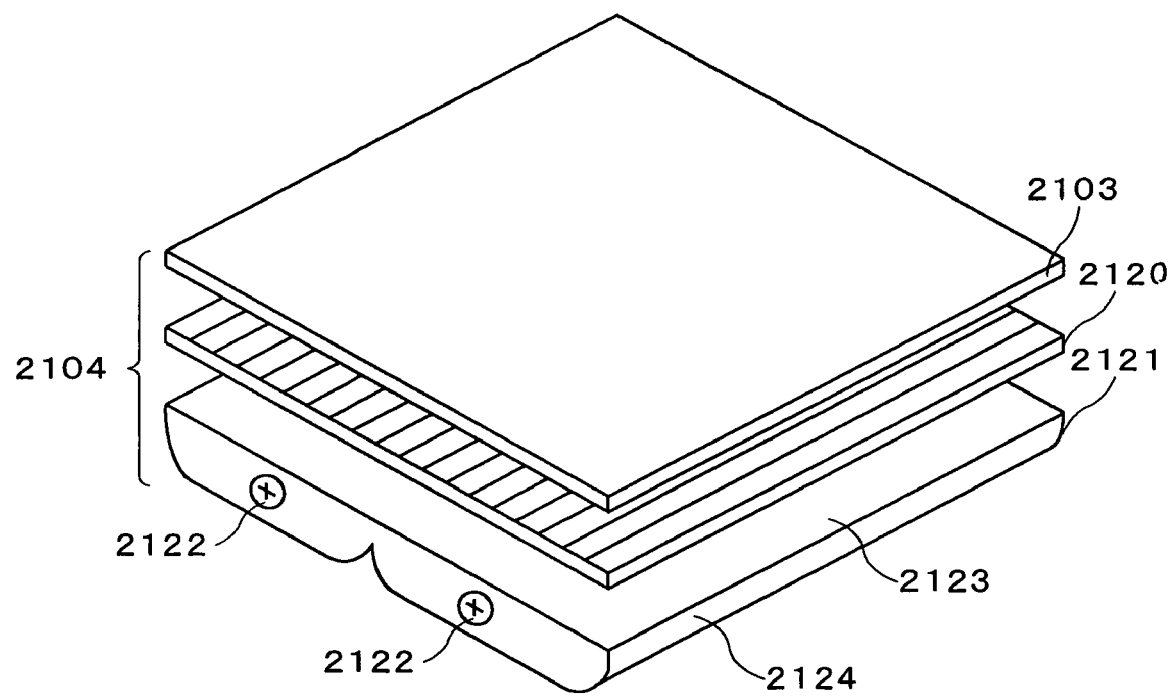
FIG. 3 is a schematic perspective view showing the illumination device used in the conventional viewing-angle-controlled liquid crystal display device disclosed in Japanese Laid-open Patent Application 9-244018.
Figure 4:
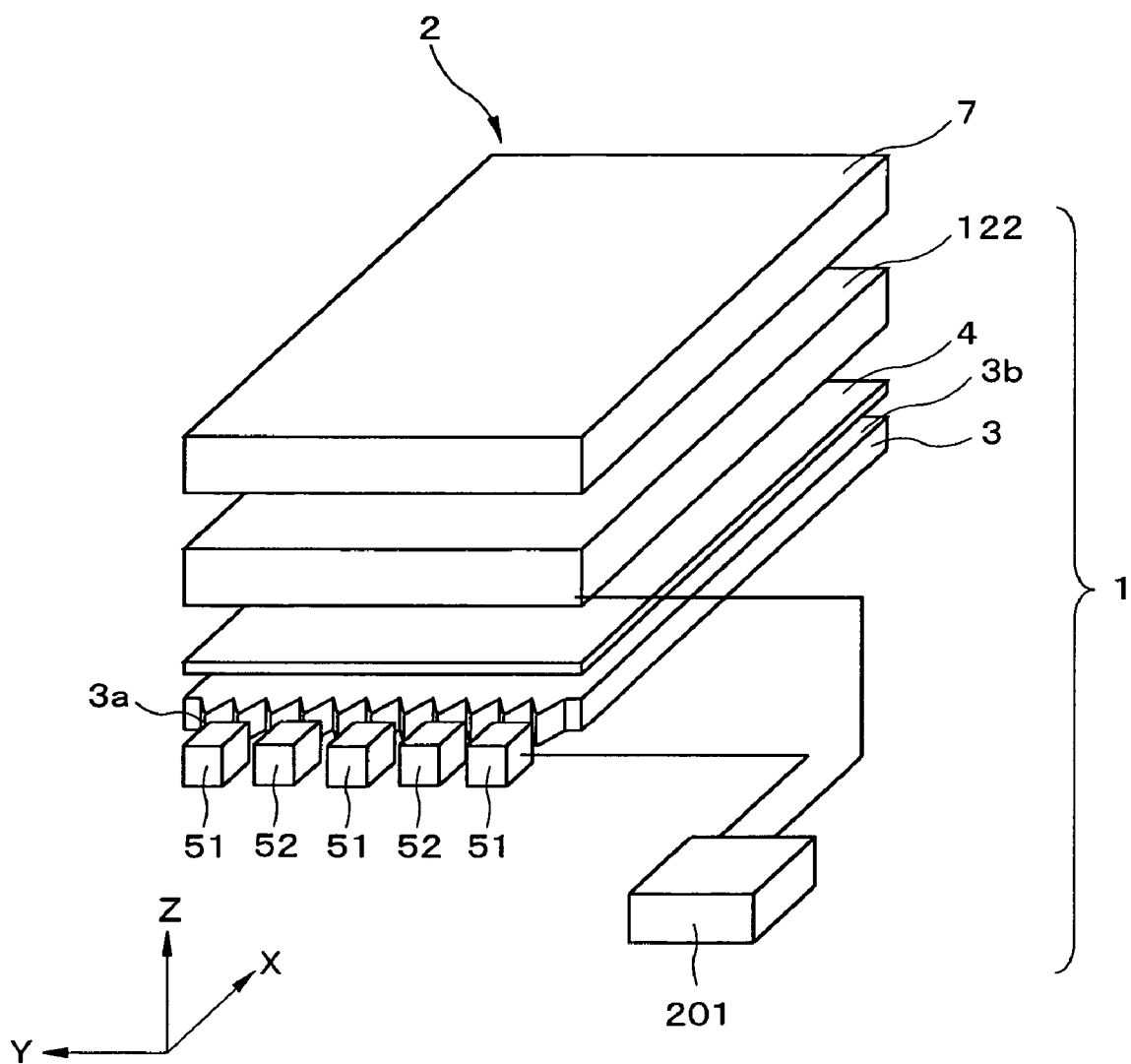
FIG. 4 is a perspective view showing the display device according to a first embodiment of the present invention.
Figure 5:
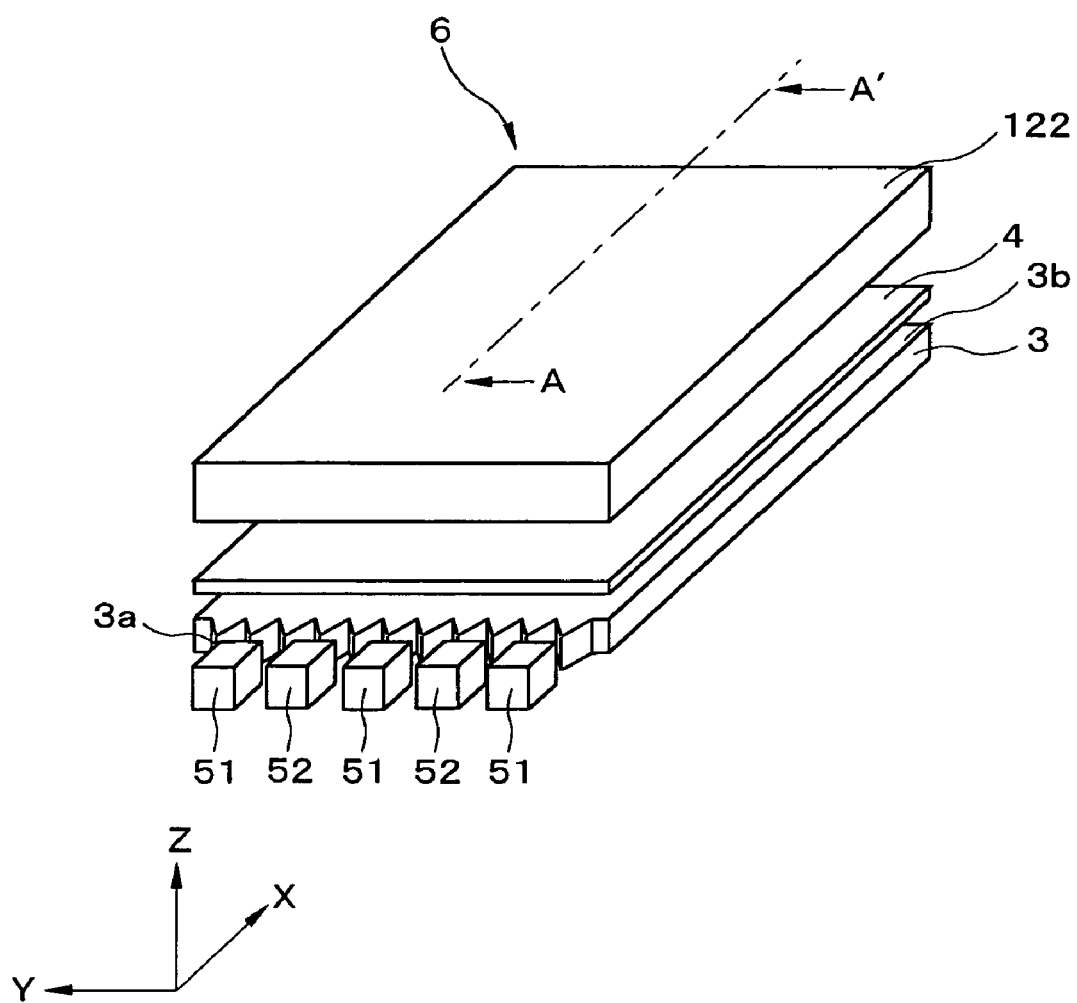
FIG. 5 is a perspective view showing a light source unit as a constituent element thereof.
Figure 6:
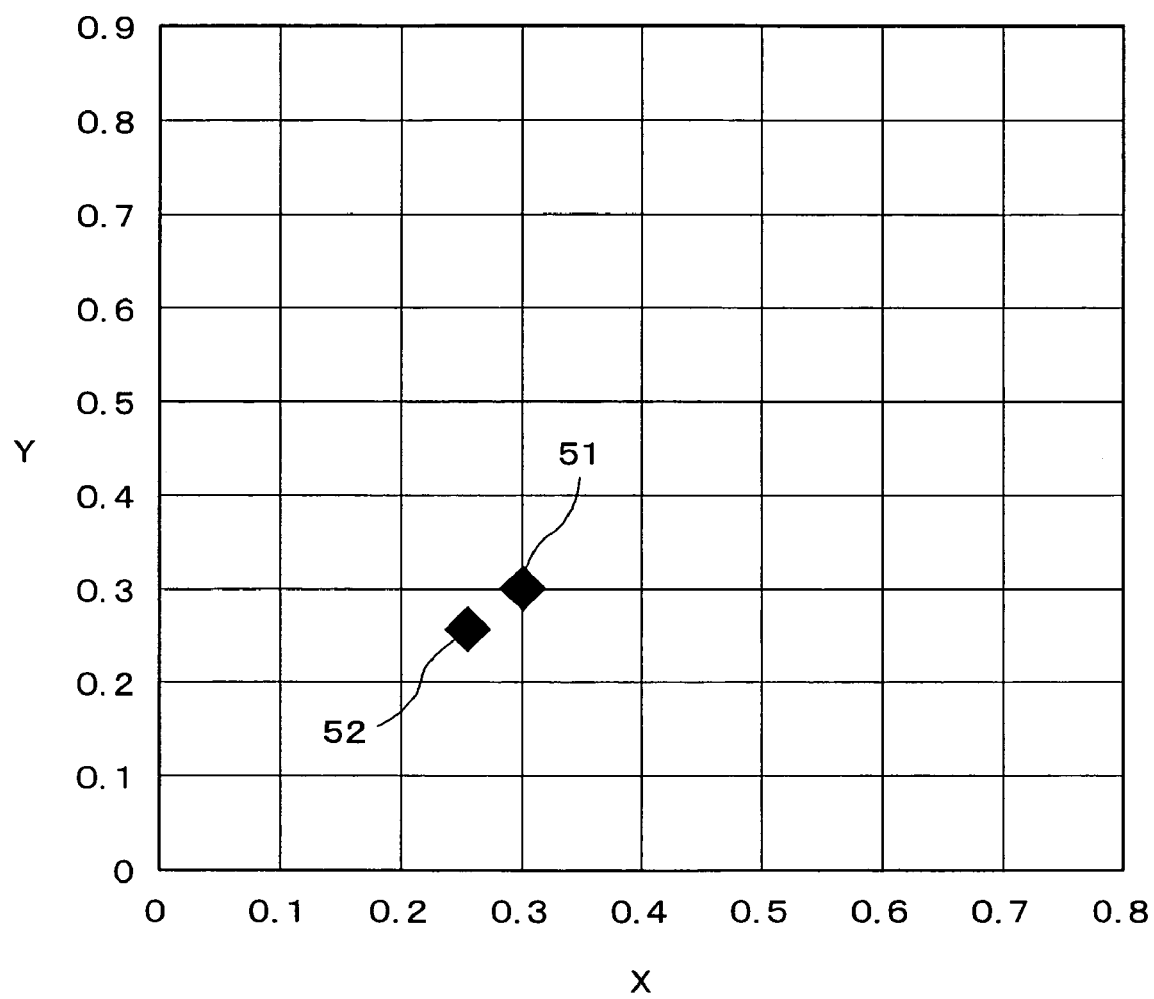
FIG. 6 is an xy chromaticity diagram depicting the chromaticity coordinates (x, y) of two types of light sources which are constituent elements of the light source unit.
Figure 7:
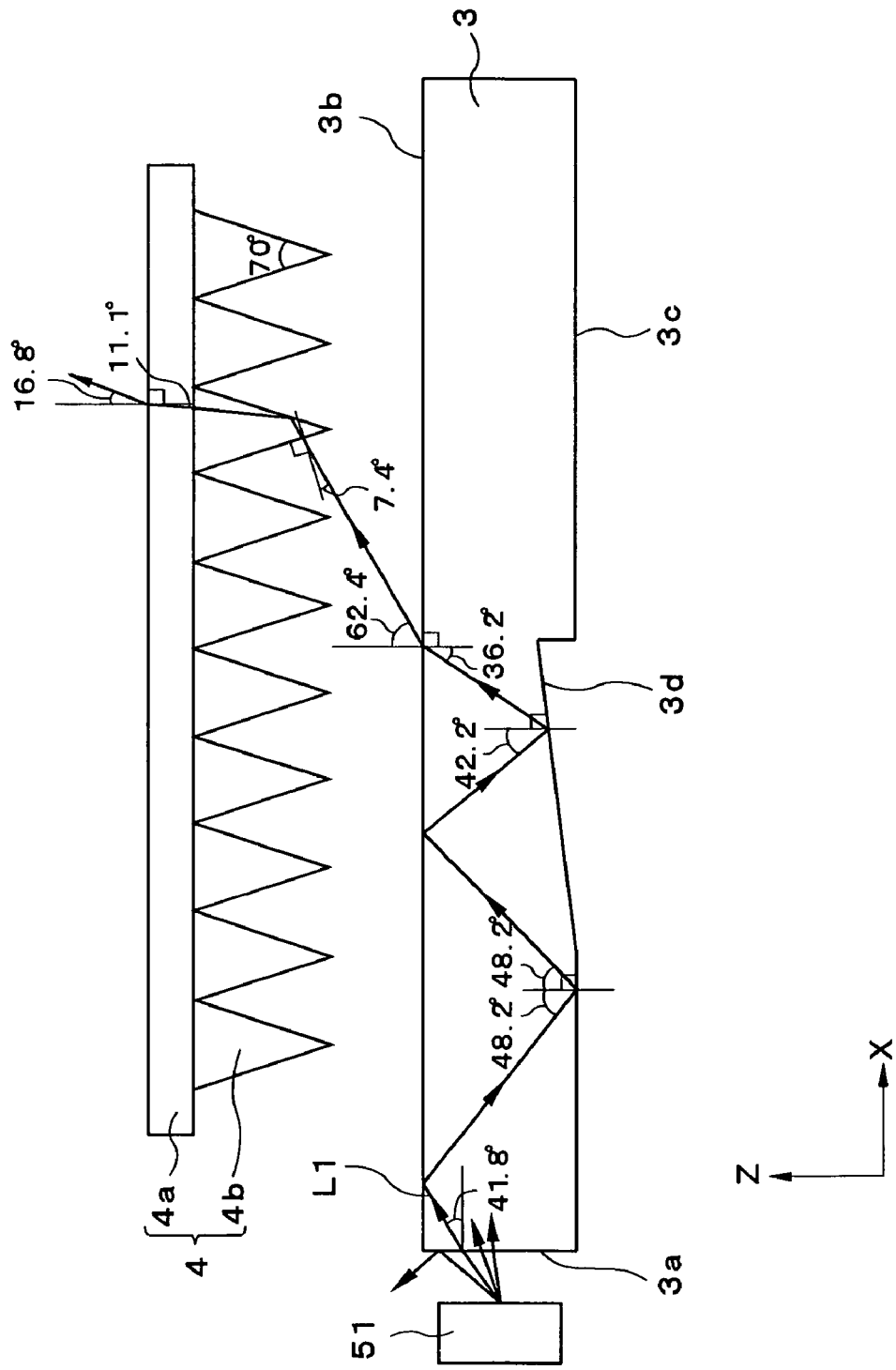
FIG. 7 is a sectional view showing a light source, light-guide plate, and optical film as constituent elements of the light source unit.
Figure 8:
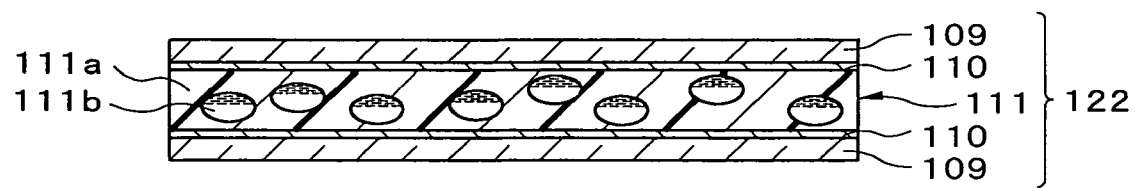
FIG. 8 is a sectional view showing the transparent/scattering state switching element that is a constituent element of the light source unit.
Figure 9:
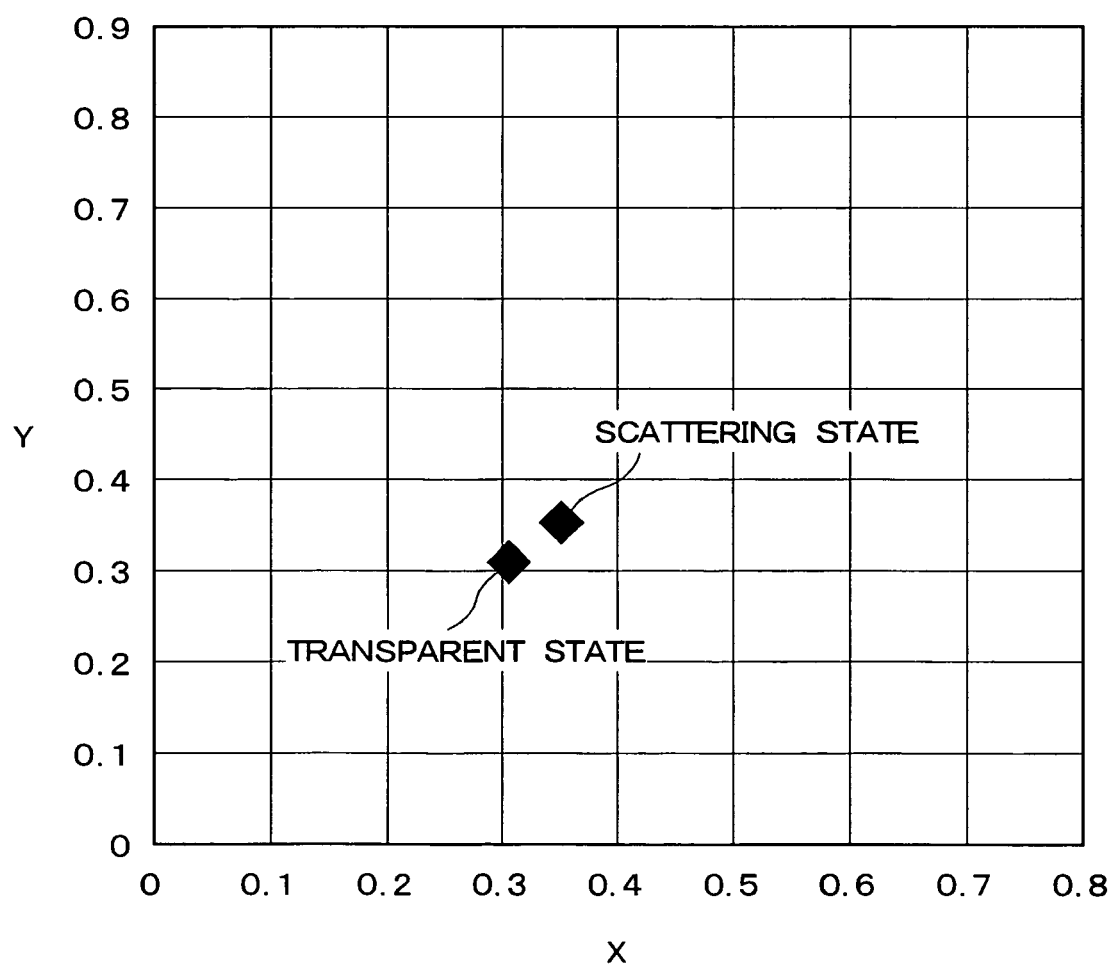
FIG. 9 is an xy chromaticity diagram depicting chromaticity coordinates (x, y) with the transparent/scattering switching element in the transparent state and in the scattering state.
Figure 10:
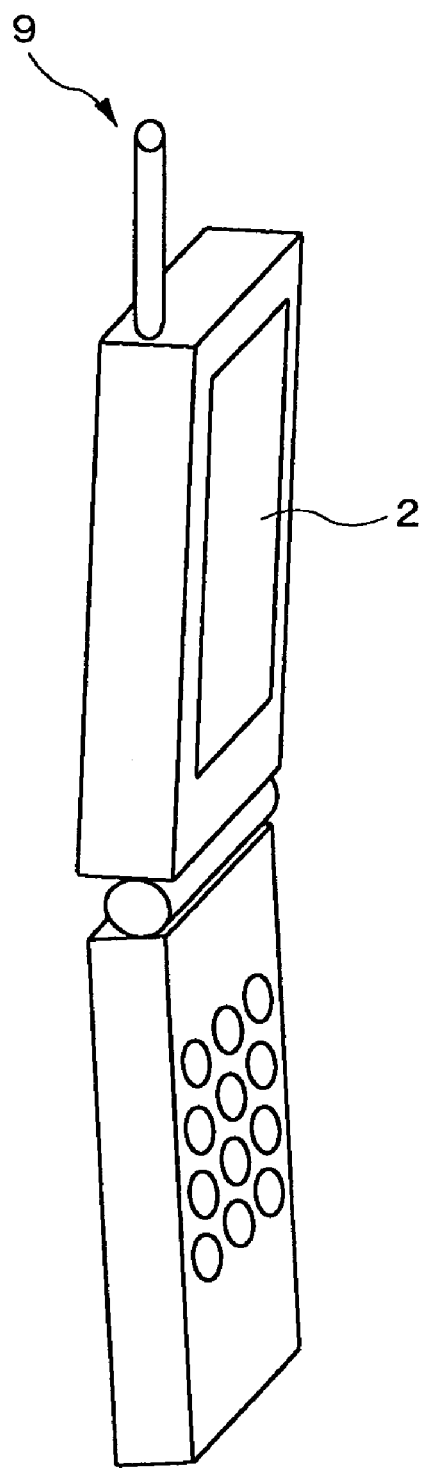
FIG. 10 is a perspective view showing the terminal device according to the present embodiment.

The following detailed description of the light source device, display device, terminal device, light source unit, and method of driving the light source device according to the invention makes reference to the accompanying drawings. First, the light source device, display device, terminal device, light source unit, and method of driving the light source device according to a first embodiment of the invention shall be described. FIG. 4 is a perspective view showing the display device according to the present embodiment; FIG. 5 is a perspective view showing a light source unit as a constituent element thereof; FIG. 6 is an xy chromaticity diagram depicting the chromaticity coordinates (x, y) of two types of light sources which are constituent elements of this light source unit; FIG. 7 is a sectional view showing a light source, light-guide plate, and optical film as constituent elements of the light source unit; FIG. 8 is a sectional view showing the transparent/scattering state switching element that is a constituent element of the light source unit; FIG. 9 is an xy chromaticity diagram depicting chromaticity coordinates (x, y) with the transparent/scattering switching element in the transparent state and in the scattering state; and FIG. 10 is a perspective view showing the terminal device according to the present embodiment.

As shown in FIG. 4, the display device 2 according to the first embodiment is composed of a light source device 1 and a transmissive liquid crystal panel 7. A light-guide plate 3 consisting of transparent material is disposed in the light source device 1. The light-guide plate 3 is of rectangular plate shape. At a location facing one side face (light-incident surface 3a) of this light-guide plate 3 there are disposed light sources of two different types. These two types of light sources may, for example, be white LEDs (Light-Emitting Diodes) 51 and bluish white LEDs 52. A plurality of these white LEDs 51 and bluish white LEDs 52 are arranged along the light-incident surface 3a of the light-guide plate 3. In one exemplary arrangement, the white LEDs 51 number three and the bluish white LEDs 52 number two. The white LEDs 51 and the bluish white LEDs 52 are arranged in alternating fashion so that LEDs of different types are situated adjacently. Light incident on the light-incident surface 3a is output uniformly by the light-guide plate 3 from its principal face (light-emitting surface 3b).

An optical film 4 is disposed on the light-emitting surface 3b side of the light-guide plate 3. The purpose of the optical film 4 is to cause light exiting the light-guide plate 3 to be reflected towards the direction of the normal line of the light-emitting surface of the light-guide plate 3. A transparent/scattering switching element 122 is disposed to the light-emitting surface side of the optical film 4. The transparent/scattering switching element 122, during exit from the opposite side thereof of light entering from the optical film 4, switches between a state of scattering the light, and a state of transmitting the light without scattering. A control circuit 201 for controlling the white LEDs 51, the bluish white LEDs 52, and the transparent/scattering switching element 122 is also provided. This control circuit 201 adjusts the luminosity of the white LEDs 51 and the bluish white LEDs 52 by controlling the amount of current. As shown in FIG. 4, the white LEDs 51, the bluish white LEDs 52, the light-guide plate 3, the optical film 4, the transparent/scattering switching element 122, and the control circuit 201 together constitute the light source device 1. The transmissive liquid crystal panel 7 is disposed on the light-emitting surface side of the transparent/scattering switching element 122, and is allowed to transmit light, whereby an image is superimposed on the light.

As shown in FIG. 5, the white LEDs 51, the bluish white LEDs 52, the light-guide plate 3, the optical film 4, and the transparent/scattering switching element 122 together constitute the light source unit 6. That is, the light source device 1 (see FIG. 4) is composed of the light source unit 6 and the control circuit 201.

For the sake of convenience, an XYZ orthogonal coordinate system is established as follows in the present specification. The direction going from the white LEDs 51 and bluish white LEDs 52 towards the light-guide plate 3 interior is designated as the +X direction, and the opposite direction as the −X direction. The +X direction and −X direction are collectively referred to as the X-axis direction. Of directions parallel to the light-emitting surface 3b of the light-guide plate 3, the one orthogonal to the X-axis direction is designated as the Y-axis direction. The direction orthogonal to both the X-axis direction and the Y-axis direction is designated as the Z-axis direction; within this Z-axis direction, the direction going from the light-guide plate 3 interior towards the light-emitting surface 3b is designated as the +Z direction, and the opposite direction as the −Z direction. The +Z direction represents the forward direction, i.e., going towards the user. The +Y direction represents the direction forming a right-handed coordinate system. That is, with the thumb of the right hand pointing in the +X direction and the index finger in the +Y direction, the middle finger points in the +Z direction.

Where an XYZ orthogonal coordinate system has been established in the manner described above, the light-emitting surface 3b of the light-guide plate 3 represents the XY plane, and viewed from the light-guide plate 3, the white LEDs 51 and bluish white LEDs 52 are situated in the −X direction, and the optical film 4 is disposed in the +Z direction. The transparent/scattering switching element 122 is disposed in the +Z direction viewed from the optical film 4.

The white LEDs 51 and bluish white LEDs 52 constituting the two different types of light sources are LEDs that are composed of a blue LED and a yellow phosphor for emitting yellow light by excitation with the blue light emitted from this blue LED, and that emit white light by excitation with blue and yellow light. LEDs that operate on this principle emit white light of a slightly different color depending on the luminosity of the bluish white LED and the intensity of the yellow light emitted from the yellow phosphor. Specifically, white light is obtained where there is balance between the blue light emitted from the blue LED and the yellow light emitted from the yellow phosphor. Bluish white light is emitted in cases in which the blue light emitted from the blue LED is more intense than the yellow light emitted from the yellow phosphor. Of the two types of the light source, the white LEDs 51 represent the former LEDs that emit white light, while the bluish white LEDs 52 represent the latter LEDs that emit bluish white light.

As shown in FIG. 6, the chromaticity coordinates of the white LEDs 51 and the bluish white LEDs 52 on the chromaticity chart are respectively (x, y)=(0.30, 0.30) and (0.26, 0.26). As noted, the light source unit 6 is furnished with three white LEDs 51 and two bluish white LEDs 52, and the LEDs of the same type are connected in series. That is, the three white LEDs 51 are connected in series, and the two bluish white LEDs 52 are connected in series.

FIG. 7 is a sectional view of the light-guide plate 3 and the optical film 4 along line A-A' in FIG. 5. An example of a light path is also shown in FIG. 7; this will be described later. As shown in FIGS. 5 and 7, a diffusion pattern is formed on the light-incident surface 3a, in order to reduce in-plane irregular luminance at the light-emitting surface 3b caused by LED placement location. As shown in FIG. 7, an inclined surface 3d is formed on the light-emitting surface 3b of the light-guide plate 3. The inclined surface 3d is inclined in the direction of illumination of light that has been emitted from the white LEDs 51 and bluish white LEDs 52, and transmitted by the light-guide plate 3 in the +X direction. The incline angle of the inclined surface 3d is six degrees with respect to the X-axis direction, for example. A plurality of inclined surfaces 3d are arrayed in the X-axis direction, with each inclined surface extending over the entire length of the light-guide plate 3 in the Y-axis direction. A hologram pattern (not shown) having anisotropy within the XY plate is formed on the light-emitting surface 3b of the light-guide plate. Light propagated within the light-guide plate 3 and emitted from the light-emitting surface 3b is imparted with increased directivity in the Y-axis direction by means of this hologram pattern.

The optical film 4 is composed of a flat plate portion 4a, and a plurality of primary prism elements 4b formed on the flat plate portion 4a on the side facing the light-guide plate 3. The primary prism elements 4b are prism elements that project out in the −Z direction with their ridgelines extending in the Y-axis direction; a plurality of these primary prism elements 4b are arrayed along the X-axis direction. The apex angle of the primary prism elements 4b is set to 70 degrees, for example. The Z-axis direction matches the direction of projection of the primary prism elements 4b; i.e., the direction that is parallel to a plane dividing the side faces of the primary prism elements 4b in to two equal parts and that is orthogonal to the Y-axis direction. The optical film 4 having the primary prism elements 4b formed thereon causes light emitted from the light-guide plate 3 to be deflected toward the +Z direction within the XZ plane, so that the light exits with high directivity in the +Z direction.

As noted, the hologram pattern formed on the light-emitting surface 3b of the light-guide plate functions to increase directivity in the Y-axis direction, so light exiting the optical film 4 has heightened directivity in the +Z direction, in relation to both the X-axis direction and the Y-axis direction. The material for the light-guide plate 3 and the optical film 4 is preferably a clear resin due to the ease of processing afforded thereby. In the present embodiment, polymethyl-methacrylate (PMMA) having a refractive index of 1.5 is used.

FIG. 8 is a sectional view showing the transparent/scattering state switching element 122 disposed on the light-emitting surface side of the optical film 4. Within the transparent/scattering switching element 122 are disposed a pair of transparent substrates 109 arranged parallel to one another, with each transparent substrate 109 having an electrode 110 disposed on the face thereof facing towards the other transparent substrate 109, so as to cover the face of the transparent substrate 109. Between the pair of transparent substrates 109, i.e., between the electrodes 110, there is disposed a PDLC (Polymer Dispersed Liquid Crystal) layer 111. Within the PDLC layer 111, liquid crystal molecules 111b are dispersed throughout a polymer matrix 111a. The PDLC layer 111 is formed, for example, by exposing a mixture of photosetting resin and a liquid crystal material to bring about setting.

In the transparent/scattering switching element 122, the orientation of the liquid crystal molecules 111b within the PDLC layer 111 is changed through application of a voltage to the PDLC layer 111 by using the pair of electrodes 110. For example, in the absence of an electric field applied to the PDLC layer, since the apparent refractive indices of the polymer matrix and the liquid crystal molecules differ, incident light is scattered and caused to exit in a scattered state. On the other hand, when an electric field is applied to the PDLC layer, the apparent refractive indices of the polymer matrix and the liquid crystal molecules become substantially identical, and a transparent state is established in which the incident light is emitted without being scattered. The transparent/scattering switching element 122 thus scatters or transmits incident light and emits the light to the transmissive liquid crystal panel 7. A 60 Hz rectangular wave is applied to the transparent/scattering switching element in order to prevent burn-in.

As shown in FIG. 4, the control circuit 201 is connected to the transparent/scattering switching element 122 and to the white LEDs 51 and bluish white LEDs 52 mentioned previously, and is used to drive and control the transparent/scattering switching element and the LEDs.

As shown in FIG. 10, the display device 2 is installed in a mobile phone 9, for example. The mobile phone 9 used as a mobile terminal in accordance with the present embodiment is provided with the above-described display device 2.

Operation of the display device according to the present embodiment constituted in the manner described above, i.e., the method for driving the light source device according to the present embodiment, will be described next. FIGS. 11A through 11G are timing charts depicting operation when the display device according to the present embodiment is switched from a narrow-angle display to a wide-angle display, wherein time is plotted on the horizontal axis of each chart. FIG. 11A has the haze (HAZE: haze value) of the transparent/scattering state switching element plotted on the vertical axis, FIG. 11B has the emission luminosity of the white LED plotted on the vertical axis, FIG. 11C has the emission luminosity of the bluish white LED plotted on the vertical axis, FIG. 11D has the frontal luminance of light prior to entering the transparent/scattering switching element plotted on the vertical axis, FIG. 11E has the chromaticity coordinate (x, y) values of light prior to entering the transparent/scattering switching element plotted on the vertical axis, FIG. 11F has the frontal luminance of light after entering the transparent/scattering switching element plotted on the vertical axis, and FIG. 11G has the chromaticity coordinate (x, y) values of light after entering the transparent/scattering switching element plotted on the vertical axis.

First, operation during a wide-angle display shall be described. When the control circuit 201 receives a wide-angle display instruction, it drives the white LEDs 51 and the bluish white LEDs 52 so that they emit light, and drives the transparent/scattering switching element 122 so that it assumes the scattering state. As a result, the white LEDs 51 and the bluish white LEDs 52 light up, and the light emitted from the white LEDs 51 and the bluish white LEDs 52 enters the light-guide plate 3 from the light-incident face 3a of the light-guide plate. As noted, since a diffusion pattern has been formed on the light-incident face 3a, the light that has entered the light-guide plate is diffused in the Y-axis direction within the light-guide plate, whereby the light of the white LEDs 51 and the bluish white LEDs 52 becomes mixed.

The following discussion of the optical path of this light focuses upon that part of this mixed light which is propagated within the XY plane. As shown in FIG. 7, due to the difference in refractive indices of the air and the resin material that makes up the light-guide plate 3, the angle formed by the direction of advance of light that has entered the light-guide plate 3 and the +X direction in the Z-axis direction is smaller than 41.80, based on Snell's law. Considered herein is light L1 that is inclined by 41.8° in the +Z direction with respect to the +X direction.

While this light does reach the light-emitting surface 3b of the light-guide plate 3, the angle thereof with respect to the Z-axis direction is 48.2°. Since this angle is greater than the critical angle of 41.8°, the light is totally reflected without exiting from the light-guide plate 3. Similarly, at the light-diffusing surface 3c as well, light incident on areas other than the inclined surface 3d is totally reflected at the same angle, so that the light is propagated in the direction away from the white LEDs 51 and the bluish white LEDs 52 while undergoing repeated total reflection between the light-emitting surface 3b and the light-diffusing surface 3c. In the course of this propagation, when light L1 is incident on the inclined surface 3d whose incline angle with respect to the X-axis direction is 6°, the angle of this light will be 42.2° from the normal line of the inclined surface 3d, and since this value is greater than the critical angle of 41.8°, the light is totally reflected and does not exit the light-guide plate 3 from the inclined surface 41. However, the angle of the totally reflected light L1 with respect to the Z-axis direction is 36.2°, and since this angle is smaller than the critical angle, light reaching the light-emitting surface 3b exits to the outside from the light-guide plate 3, with the angle subsequent to exit being 62.4° with respect to the Z-axis direction.

In the manner described above, light incident on the light-guide plate 3 will always have an angle of 41.8° or less with respect to the Z-axis direction, subsequent to incidence. Consequently, the incident light will have an angle of 48.2° or greater with respect to the Z-axis direction when reaching the light-emitting surface 3b or the light-diffusing surface 3c of the light-guide plate 3, and will be totally reflected. In the course of propagation of the light through the light-guide plate 3 while being totally reflected at the light-emitting surface 3b and the light-diffusing surface 3c, each time that the light is totally reflected by the inclined surface 3d whose incline angle is 6°, the angle of the direction of advance of the light with respect to the Z-axis direction approaches the critical angle, and at the point in time that this angle becomes smaller than the critical angle, the light will exit from the light-emitting surface 3b or the flat surface of the light-diffusing surface 3c. As a result, light exiting the light-guide plate 3 has strong directivity in a direction inclined by about 60° from the Z-axis direction within the XZ plane.

Light L1 that has exited from the light-guide plate 3 at an incline angle of 62.4° with respect to the Z-axis direction is now incident on the optical film 4. Since the apex angle of the primary prism elements 4b is 70°, the angle of incidence on the primary prism element 4b is 7.4°, and an angle of 4.9° is formed by the direction of advance of incident light within the primary prism element 4b and the normal line of the conical incident face. Light L1 subsequently reaches the side face on the opposite side of the primary prism element 4b, but since the angle thereof with respect to this side face is 65.1° from the plane normal line, it is totally reflected and advances in a direction 11.1° from the Z-axis. Subsequently, by Snell's law, the angle of the light L1 exiting from the optical film 4 is a direction 16.8° from the Z-axis. That is, light exiting the optical film 4 has strong directivity in essentially the Z-axis direction within the XZ plane.

Next, directivity in the Y-axis direction will be described. As noted, light emitted from the white LEDs 51 and the bluish white LEDs 52, after entering the light-guide plate 3, undergoes diffusion at least within the XY plane. Light of this component having undergone diffusion in the Y-axis direction is condensed by the hologram pattern formed on the light-emitting surface as mentioned previously, increasing its directivity. That is, the radiation range of light emitted from the optical film 4 is limited to a narrow range.

The light emitted from the optical film 4 is now incident on the transparent/scattering switching element 122. Since the transparent/scattering switching element 122 is in the scattering state in the absence of applied voltage, the high-directivity light is scattered uniformly by the transparent/scattering switching element 122, and is thereby dispersed over a wide angle range. That is, the light is scattered by the transparent/scattering switching element 122, directivity is reduced, and wide-angle light is generated. The light distributed over this wide range is incident on the transmissive liquid crystal panel 7 which imposes an image, and the light then exits while maintaining a wide angle. In this way, the image is displayed over a wide viewing angle.

Next, operation during a narrow-angle display shall be described. When the control circuit 201 receives a narrow-angle display instruction, it drives the white LEDs 51 so that they emit light, as well as driving the transparent/scattering switching element 122 so that it is brought to the transparent state. As a result, only the white LEDs 51 light up, and the light emitted from the white LEDs 51 propagates through the light-guide plate 3 and exits from the optical film 4 in a narrow angle range, in the same manner as with wide-angle display. This light is incident on the transparent/scattering switching element 122. Since the transparent/scattering switching element 122 is in the transparent state when voltage is applied thereto, the high-directivity light is transmitted unchanged, without being scattered by the transparent/scattering switching element 122. That is, the light exits the transparent/scattering switching element 122 while maintaining high directivity. The light having the high-directivity distribution is incident on the transmissive liquid crystal panel 7 to superpose an image, and the light then exits while maintaining high directivity. In this way, the image is displayed over a narrow viewing angle.

Next, the case of switching from a narrow-viewing-angle display to a wide-viewing-angle display during display shall be described. First, frontal luminance shall be described. In cases in which the quantity of light from the white LEDs 51 and bluish white LEDs 52, which are the light sources, is the same before and after switching, frontal luminance will be lower in a wide-viewing-angle display mode than in a narrow-viewing-angle display mode. This is because the light exiting the transmissive liquid crystal panel 7 maintains high directivity in the narrow-viewing-angle display mode, whereas the light is scattered by the transparent/scattering switching element 122 in the wide-viewing-angle display mode, reducing the beam of light advancing in the frontal direction, so that there is a relative drop in frontal luminance.

It is preferable that there be no change in luminance for the main user positioned in the frontal direction when a switch is made between a narrow-viewing-angle display mode and a wide-viewing-angle display mode. Accordingly, in order to prevent a drop in frontal luminance when a switch is made from a narrow-viewing-angle display mode to a wide-viewing-angle display mode, it is necessary to increase the current flowing to the white LEDs 51 and the bluish white LEDs 52 in order to increase the quantity of light emitted from the LEDs and to avoid a drop in frontal luminance. Similarly, when a switch is made from a wide-viewing-angle display mode to a narrow-viewing-angle display mode, it is necessary to reduce the electric current flowing to the LEDs and to reduce the quantity of light emitted from the LEDs in order to avoid an appreciable rise in frontal luminance. In this way, switching between a narrow-viewing-angle display mode and a wide-viewing-angle display mode must be accompanied at the same time not only by the switching of the transparent/scattering switching element 122 between the transparent and scattering states, but also by the simultaneous switching of the quantity of light emitted from the light source.

The color appearance of the light shall be described next. As noted, in the display device according to the present embodiment, the transparent/scattering switching element 122 is disposed between the optical film 4 and the transmissive liquid crystal panel 7, and the transparent/scattering switching element 122 is furnished with a PDLC layer 111 so that the light radiation angle can be switched by transmission or scattering of light by the PDLC layer 111. However, in an element such as the PDLC layer, which has a fine structure and in which light is scattered by the refractive index distribution of this fine structure, the extent of scattering of light depends on the wavelength of the light, with light of shorter wavelength being scattered more strongly, and light of longer wavelength being more difficult to scatter. That is, with the transparent/scattering switching element in the scattering state, blue light is scattered easily, while red light is scattered with difficulty, so that light exiting the transparent/scattering switching element will have a lower proportion of blue, giving it a yellowish appearance. In the transparent state, on the other hand, the apparent refractive index distribution is small, so this kind of color change is essentially absent.

The color change differs according to the fine structure and thickness of the transparent/scattering switching element. According to one example, in cases in which light having the chromaticity coordinates $(x, y) = (0.30, 0.30)$ on the xy chromaticity chart is incident on the PDLC layer, the chromaticity coordinates of the exiting light in the transparent state are $(x, y) = (0.31, 0.31)$, whereas in the scattering state the coordinates are $(x, y) = (0.35, 0.35)$, as shown in FIG. 9. That is, comparing the scattering state with the transparent state, the chromaticity coordinates x and y are greater in the former, so that the exiting light has a yellowish tinge.

Accordingly, in the present embodiment, as shown in FIG. 11A to 11C, in a switch from a narrow-viewing-angle display mode to a wide-viewing-angle display mode, haze of the transparent/scattering switching element is increased, in association with which the quantity of light of the bluish white LEDs 52 is increased. That is, in the narrow-viewing-angle display mode up to time t1, only the white LEDs 51 are lit, whereas in the wide-viewing-angle display mode beginning at time t1, both the white LEDs 51 and the bluish white LEDs 52 are lit. It is thereby possible to prevent the phenomenon of a drop in frontal luminance during switching from a narrow-viewing-angle display mode to a wide-viewing-angle display mode, as shown in FIGS. 11d and 11f.

As shown in FIG. 11E, only the white LEDs 51 are lit prior to time t1 in the narrow-viewing-angle display mode. Therefore, the chromaticity coordinates of the light prior to entering the transparent/scattering switching element are essentially the same as the chromaticity coordinates of the white LEDs 51, namely, (x, y)=(0.30, 0.30). In the wide-viewing-angle display mode beginning at time t1, on the other hand, the bluish white LEDs 52 are lit in addition to the white LEDs 51, and thus the light has chromaticity coordinates of (x, y)= (0.27, 0.27), and hence has a bluish appearance.

Consequently, as shown in FIG. 11G, in the narrow-viewing-angle display mode prior to time t1, as noted previously, the chromaticity coordinates of light having exited the transparent/scattering switching element are (x, y)=(0.31, 0.31), and hence has an essentially white appearance. In the wide-viewing-angle display mode beginning at time t1, on the other hand, the transparent/scattering switching element assumes the scattering state and scatters more of the short-wavelength light, but since, as noted, the light entering the transparent/scattering switching element now contains more short-wavelength light, the chromaticity coordinates are (x, y)=(0.31, 0.31) so that the light maintains an essentially white appearance. That is, the chromaticity coordinates of light emitted from the transparent/scattering switching element can be kept the same in both the narrow-viewing-angle display mode prior to time t1 and the wide-viewing-angle display mode beginning at time t1. By so doing, the phenomenon whereby the display takes on a yellowish hue unpleasant for the user can be reduced during switching from a narrow-viewing-angle display mode to a wide-viewing-angle display mode.

The case in which the display device 2 is switched from a narrow-viewing-angle display to a wide-viewing-angle display was described above, but the same principle is applicable to the case of switching from a wide-viewing-angle display to a narrow-viewing-angle display. Specifically, by extinguishing the bluish white LEDs 52 when a switch is made from a wide-viewing-angle display to a narrow-viewing-angle display, it is possible to prevent a phenomenon whereby the display takes on a bluish hue unpleasant for the user. However, since yellow discoloration of the display tends to be more of a problem, the present embodiment is effective for preventing the phenomenon of yellow discoloration of the display during switching from a narrow-viewing-angle display to a wide-viewing-angle display.

The method of controlling the light source device according to the present embodiment will be described in quantitative terms below. During switching of the state of the transparent/scattering switching element, the control circuit 201 controls the white LEDs 51 and the bluish white LEDs 52 in such a way that the following Eqs. 4 to 6 are satisfied, where the chromaticity coordinates of light emitted from the light-guide plate 3, i.e., of the mixed light emitted from the three white LEDs 51 and the two bluish white LEDs 52 (hereinafter termed "mixed light") when the transparent/scattering switching element 122 is placed in the transparent state, are designated as $(xt, yt)$, the chromaticity coordinates of light emitted from the transparent/scattering switching element are designated as $(xpt, ypt)$, the chromaticity coordinates of light emitted from the transparent/scattering switching element when the light-source light having chromaticity coordinates $(xt, yt)$ enters the transparent/scattering switching element while the element is in the scattering state are designated as $(xptd, yptd)$, the chromaticity coordinates of the light source with the transparent/scattering switching element in the scattering state are designated as $(xd, yd)$, and the chromaticity coordinates of light emitted from the transparent/scattering switching element at this time are designated as $(xpd, ypd)$.

Eqs. 4 to 6 are identical expressions to Eqs. 1 to 3 given previously.

$$(xptd-xpt) \times (xt-xd) > 0 \qquad \text{[Eq. 4]}$$

$$(yptd-ypt) \times (yt-yd) > 0 \qquad \text{[Eq. 5]}$$

$$(xptd-xpt)^2 + (yptd-ypt)^2 > (xpd-xpt)^2 + (ypd-ypt)^2 \qquad \text{[Eq. 6]}$$

Eqs. 4 to 6 above shall be described below. Light whose aforementioned chromaticity coordinates are $(xt, yt)$ represents light-source light that is always emitted by the light-guide plate in conventional light source devices, as well as light-source light that is emitted from the light-guide plate solely during a narrow-angle display in the present embodiment. Light whose aforementioned chromaticity coordinates are $(xpt, ypt)$ represents light that is emitted from the transparent/scattering switching element 122 during a narrow-angle display in conventional light source devices and in the light source device of the present embodiment. Light whose aforementioned chromaticity coordinates are $(xptd, yptd)$ represents light emitted from the transparent/scattering switching element during a wide-angle display in conventional light source devices. Light whose chromaticity coordinates are $(xd, yd)$ represents light-source light emitted from the light-guide plate during a wide-angle display in the light source device of the present embodiment.

Eq. 4 above is synonymous with:

(1) xptd−xpt>0, and xt−xd>0, or (2) xptd−xpt<0, and xt−xd<0.

In the case of (1) above, since xptd>xpt, this means that in cases in which the light-source light remains the light-source light during a narrow-angle display, and the transparent/scattering switching element is in the scattering state, the chromaticity coordinates of light emitted from the transparent/scattering switching element will be greater than the chromaticity coordinates when the transparent/scattering switching element is in the transparent state. In this case, the chromaticity coordinates of the light-source light during a wide-angle display will be smaller than the chromaticity coordinates of the light-source light during a narrow-angle display. That is, xt>xd. In other words, when light-source light during a narrow-angle display passes through the transparent/scattering switching element in the scattering state, the chromaticity coordinates of the light having passed through the transparent/scattering switching element become larger. Thus, change in chromaticity coordinates of light having passed through the transparent/scattering switching element can be reduced by making the chromaticity coordinates of the light-source light during a wide-angle display smaller.

The case of (2) above is the opposite of the case of (1) above, and means that when light-source light during a narrow-angle display has passed through the transparent/scattering switching element in the scattering state, the chromaticity coordinates of the light will be smaller than when the light has passed through the transparent/scattering switching element in the transparent state. The change in chromaticity coordinates of light having passed through the transparent/scattering switching element can thus be reduced by increasing the chromaticity coordinates of the light-source light during a wide-angle display. The above applies to Eq. 5 as well.

In order to avoid a situation where the light-source light is caused to change to an excessive extent, conversely resulting in a large change in the chromaticity coordinates of the light having passed through the transparent/scattering switching element, the extent of change of the chromaticity coordinates of light-source light is specified by the aforementioned Eq. 6.

Eq. 6 means that, based on the chromaticity coordinates (xpt, ypt), the chromaticity coordinates (xpd, ypd) are located closer to the chromaticity coordinates (xpt, ypt) than to the chromaticity coordinates (xptd, yptd). Specifically, it means that, as compared to the case in which light-source light during a narrow-angle display in the conventional light source device has passed through the transparent/scattering switching element in the scattering state, in the case in which light-source light during a wide-angle display in the light source device according to the present embodiment has passed through the transparent/scattering switching element in the scattering state, the color appearance of the light will be closer to that in the case in which light-source light during a narrow-angle display has passed through the transparent/scattering switching element in the transparent state.

Next, the effects of the present embodiment shall be described. In the display device according to the present embodiment, when a switch is made from a narrow-angle display to a wide-angle display, haze of the transparent/scattering switching element is increased, in association with which the quantity of light of the bluish white LEDs 52 is increased, thereby making smaller the chromaticity coordinates of the light-source light so that the light is bluish. The transparent/scattering switching element in the scattering state produces greater scattering of the short-wavelength component. Therefore, if the color of the light source remains the same during a narrow-angle display and wide-angle display, the light exiting the transparent/scattering switching element will have a yellowish tinge. According to the present embodiment, however, by giving the light source a bluish hue during a wide-angle display, it is possible to maintain the light at the same white color as during a narrow-angle display. Also, by increasing the quantity of light of the bluish white LEDs during a wide-angle display in addition to the lighting of the white LEDs, frontal luminance can be maintained at the same level as during a narrow-angle display.

According to the present embodiment, by arranging the white LEDs and the bluish white LEDs in alternating fashion, the occurrence of irregular luminance can be reduced, even where the drive conditions of the respective LEDs differ between a narrow-angle display and a wide-angle display.

Additionally, in the present embodiment, all of the white LEDs are connected in series, and all of the bluish white LEDs are connected in series. By connecting the LEDs of the same type in series in this manner, LEDs of the same type can be supplied with equal electrical current, and luminosity variability caused by variability in LED internal impedance can be reduced.

While the present embodiment describes the use of LEDs of two types, namely, white LEDs and bluish white LEDs, as the light sources, the invention is not limited thereto, and it is also possible to employ any combination whereby the chromaticity coordinates of the light source can be varied between a narrow-angle display and a wide-angle display. As a result, it is possible to reduce the color change of light exiting the transparent/scattering switching element. It is acceptable to use LEDs of three or more types.

In the present embodiment, an LED of a type composed of a blue LED and a yellow phosphor that emits yellow light by excitation with the blue light emitted from the blue LED is used as an LED. However, the invention is not limited thereto, and can also be implemented effectively for a light source that emits fixed proportions of light whose wavelengths can be easily scattered by the transparent/scattering switching element in a scattering state, and light that has other wavelengths, so that the spectral balance of the emitted light cannot be varied freely through driving conditions or the like. One example of such a light source is an LED of a type composed of an ultraviolet LED that emits ultraviolet light, and red/blue/green phosphors that emit red/blue/green light by excitation with the ultraviolet light emitted from the ultraviolet LED. With this type of LED, the emission proportion of red/blue/green is fixed depending on the amount of the individual red/blue/green phosphors, but by using LEDs with an increased amount of blue phosphor as the bluish white LEDs, effects analogous to the present embodiment can be obtained. In particular, where LEDs of the type composed of an ultraviolet LED and red/blue/green phosphors are used, it is possible to display more vivid colors and to improve color rendering, as compared to the use of LEDs of a type composed of a blue LED and a yellow phosphor that emits yellow light by excitation with the blue light emitted from the blue LED.

Change in color during switching between a narrow-angle display and a wide-angle display can also be reduced by using a light source device that employs a light source whose emission proportions of various wavelength bands can be controlled through driving conditions or the like. One example of such a light source is an LED containing red/blue/green colors in a single package, with each color being controlled independently. However, the use of such a light source requires major control circuitry, and the cost of the light source will thus be higher. In contrast, the present embodiment allows the control circuitry to be simplified and costs to be reduced because it is sufficient merely to use a plurality of types of light sources whose emission proportion are fixed depending on the wavelength, and to control the emission level of the light sources of each type.

In the present embodiment, three white LEDs and two bluish white LEDs were used, but this is not limiting, it being possible to use different numbers instead.

The white LED set composed of three serially connected white LEDs and the bluish white LED set composed of two serially connected bluish white LEDs may share either cathode or anode terminals. By so doing, three lines, rather than four, from the light source will suffice, making it possible to conserve space.

The white LEDs and bluish white LEDs are preferably contained in mutually different packages. Costs can thereby be reduced since ordinary light-emitting diodes having mutually different chromaticity coordinates can merely be used.

The transparent/scattering switching element is not limited to one provided with a PDLC layer, it being possible to use any element switchable between a transparent state and a scattering state. For example, an element using polymer network liquid crystals (PNLC) or an element using dynamic scattering (DS) is acceptable as well. In the present embodiment, the PDLC layer is one that assumes the scattering state in the absence of applied voltage, and assumes the transparent state when a voltage is applied. Thus, the intensity of the light source during the scattering state can be enhanced without increasing the battery capacity, since the transparent/scattering state switching element no longer consumes power when in the scattering state, and the power that would have been consumed can be allocated to the light source. It is also possible to use a PDLC layer that assumes the transparent state in the absence of applied voltage, and the scattering state when a voltage is applied. This type of PDLC layer can be fabricated by exposing a polymer matrix to light to cure the polymer matrix while applying a voltage. By this configuration, there is no need to apply a voltage to the PDLC layer, so power consumption can be reduced in a mobile information terminal in which narrow-angle display is frequently used. Cholesteric liquid crystals, ferroelectric liquid crystals, or the like may also be used as the liquid crystal molecules of the PDLC layer. Even when voltage is no longer applied, these liquid crystals retain the same orientation as when the voltage was applied, i.e., the crystals have memory properties. By using this type of PDLC layer, it becomes possible to reduce power consumption.

The display panel used in combination with the planar light source device of the present invention is not limited to a liquid crystal panel, and any display panel that uses a light source device may be used. The liquid crystal panel is also not limited to transmissive type, and any panel that has a transmissive area in each pixel may be used. A transflective liquid crystal panel having a reflective area in a portion of each pixel, a micro-transmissive transflective liquid crystal panel, or a micro-reflective liquid crystal panel may also be used. A liquid crystal panel is preferred that has minimal dependence on the viewing angle. Grayscale inversion during display at a wide viewing angle can thereby be reduced. Examples of the mode of such a liquid crystal panel include the horizontal field mode IPS (In-Plane Switching), FFS (Fringe Field Switching), AFFS (Advanced Fringe Field Switching), and the like. Vertical alignment modes include MVA (Multi-domain Vertical Alignment), which is multi-domain and has reduced viewing-angle dependency, as well as PVA (Patterned Vertical Alignment), ASV (Advanced Super V), and the like. Furthermore, a film-compensated TN mode liquid crystal display panel may also be appropriately used.

In the present embodiment, a mobile phone was described as the terminal device, but the invention is not limited thereto, and the display device according to the present embodiment can also be implemented suitably not only in a mobile phone, but in various other kinds of terminal devices such as PDAs (Personal Digital Assistant: personal information terminal), gaming devices, digital cameras, digital video cameras, and various other types of mobile terminal devices. The display device according to the present embodiment may be implemented not only in mobile terminal devices, but also in notebook-type personal computers, cash dispensers, vending machines, and other various types of terminal devices.

Figure 12:
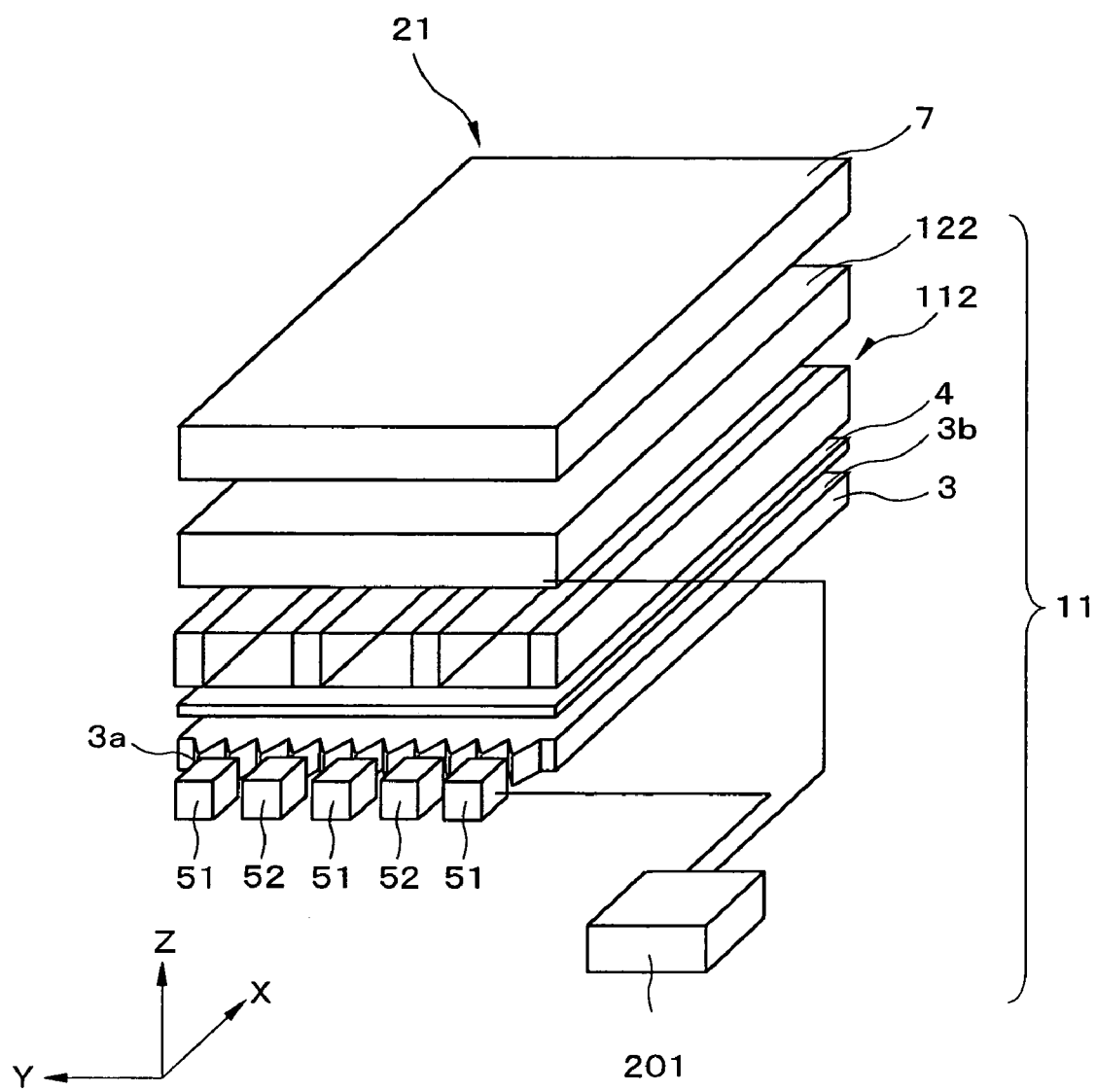
FIG. 12 is a perspective view showing the display device according to a second embodiment of the invention.
Figure 13:
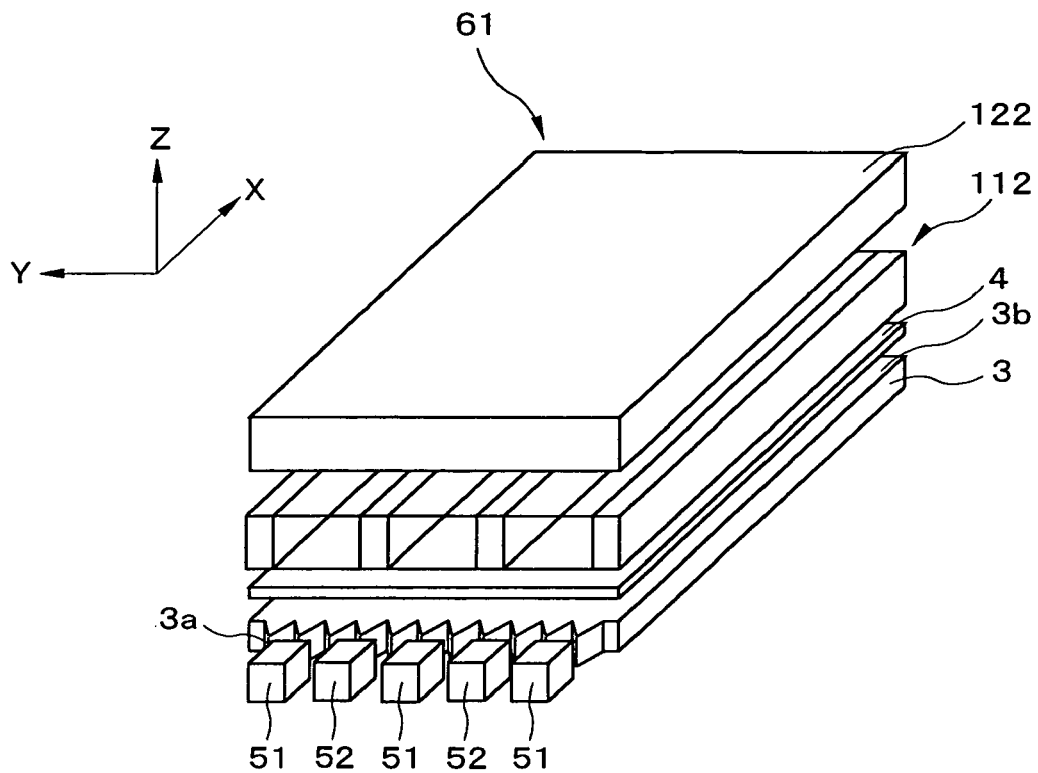
FIG. 13 is a perspective view showing a light source unit as a constituent element thereof.

Next, a second embodiment of the invention shall be described. FIG. 12 is a perspective view showing the display device according to the present embodiment of the invention; FIG. 13 is a perspective view showing a light source unit as a constituent element thereof; and FIG. 14 is a perspective view showing a louver as a constituent element thereof and which constitutes a light direction regulating element.

As shown in FIGS. 12 and 13, as compared to the display device 2, light source device 1, and light source unit 6 according to the first embodiment described previously, a characteristic feature of the display device 21, light source device 11, and light source unit 61 according to the second embodiment feature is that these devices have as a constituent element a louver 112 that constitutes a light direction regulating element. The louver 112 is positioned between the optical film 4 and the transparent/scattering switching element 122.

Figure 14:
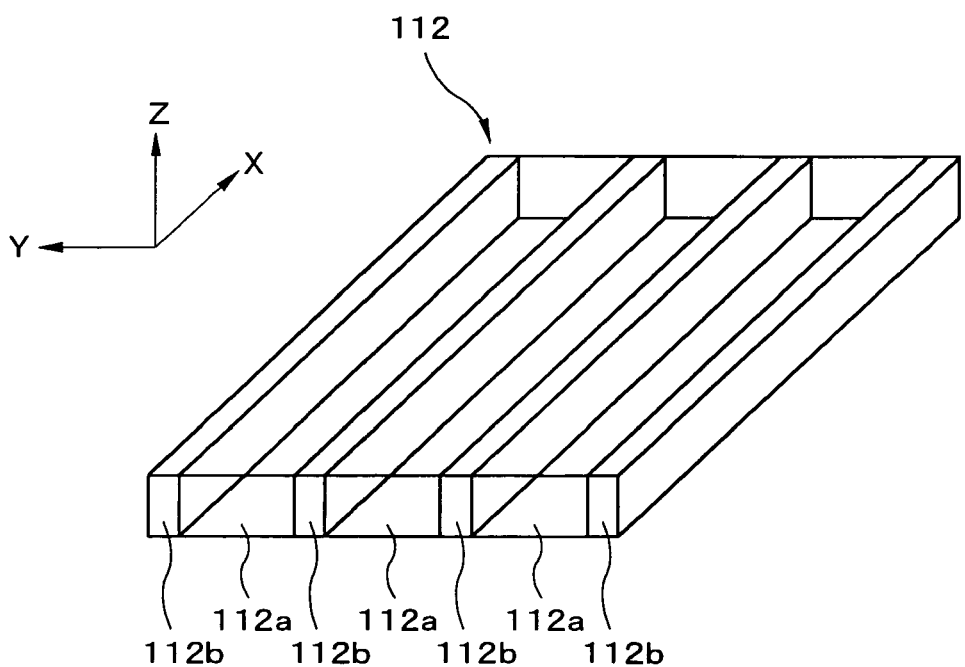
FIG. 14 is a perspective view showing a louver as a constituent element thereof.

As shown in FIG. 14, the louver 112 has transparent zones 112a that transmit light, and absorbing zones 112b that absorb light, arrayed in alternating fashion in a direction parallel to the louver surface. The direction in which the transparent zones 112a and absorbing zones 112b are arrayed in alternating fashion is the Y-axis direction in FIG. 12. Other aspects in the present embodiment are similar to those in the first embodiment described previously.

In the present embodiment, light inclined at an angle equal to a prescribed value or greater in the Y-axis direction with respect to the +Z direction, which is part of the light exiting the optical film 4, reaches the absorbing zones 112b and is eliminated through absorption. Thus, the louver 112 can increase the directivity in the Y-axis direction of light emitted from the optical film 4. As a result, leakage of light in the diagonal direction during a narrow-angle display can be reduced, and the effect to prevent surreptitious viewing can be increased. The operation and effects of this second embodiment are otherwise analogous to those of the first embodiment described previously.

In the present embodiment, there is shown an example wherein the transparent zones and absorbing zones of the louver are arrayed in the Y-axis direction, but, the invention is not limited thereto, with a rotating arrangement within the XY plane being acceptable as well. By so doing, moiré appearing between the louver and the display panel can be prevented from standing out, and display quality can be improved.

Figure 15:
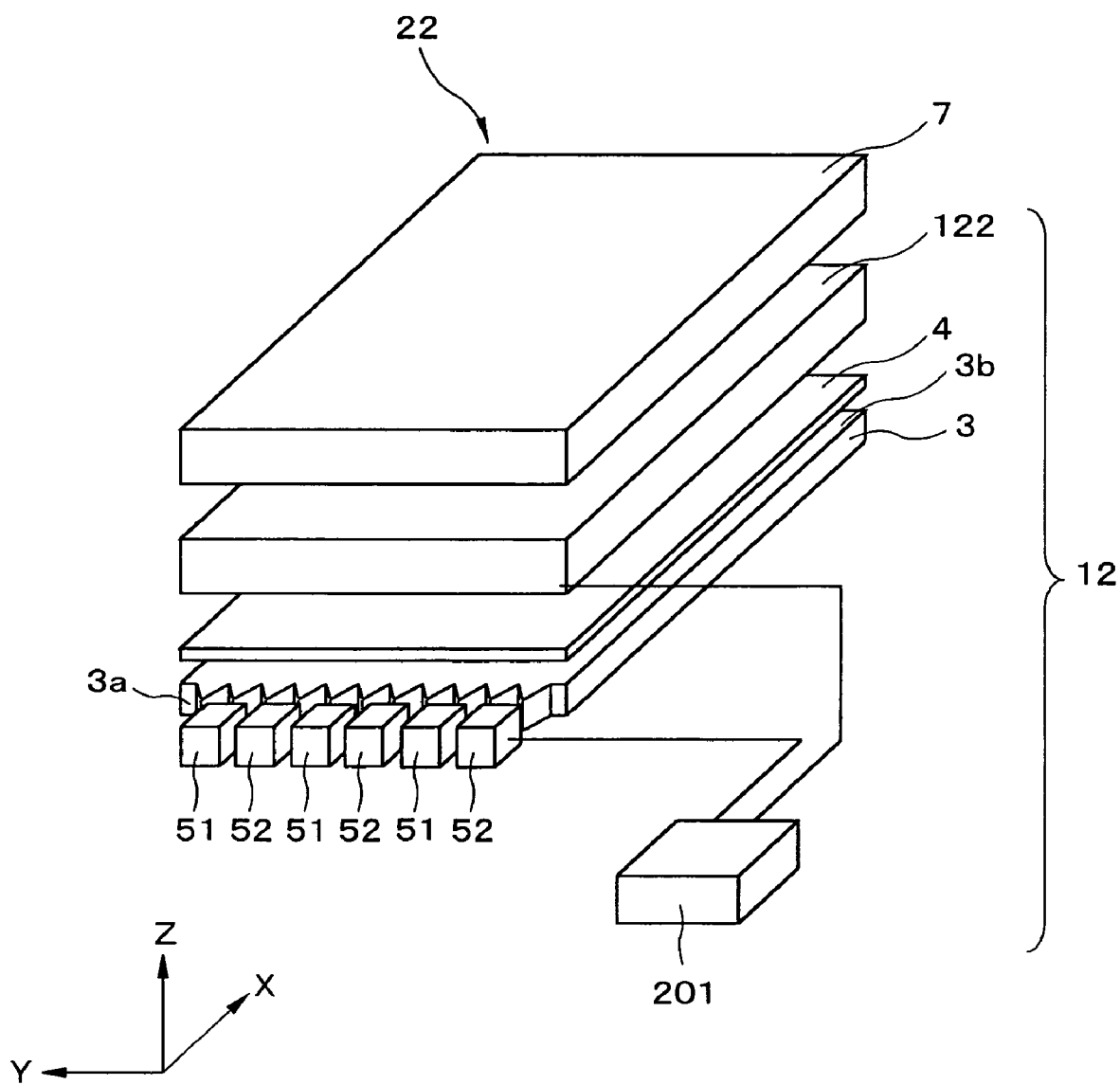
FIG. 15 is a perspective view showing the display device according to a third embodiment of the invention.

Next, a third embodiment of the invention shall be described. FIG. 15 is a perspective view showing the display device according to this embodiment of the invention. As shown in FIG. 15, the display device 22, light source device 12, and light source unit according to the third embodiment differ from the display device 2, light source device 1, and light source unit 6 according to the above-described first embodiment in that there are three serially connected bluish white LEDs, the same number as the white LEDs. In other respects the present embodiment is similar to the first embodiment described previously.

In this embodiment, the bluish white LEDs and the white LEDs are equal in number, and the LEDs of each type are connected in series so that the driving voltage may be the same for each. By so doing, the control circuit design can be made simpler, allowing lower cost, space savings, and improved reliability to be obtained. The operation and effects of this third embodiment are otherwise analogous to those of the first embodiment described previously.

Figure 16A:
FIGS. 16A through 16G are timing charts depicting operation when the display device according to the present embodiment is switched from a narrow-angle display to a wide-angle display, wherein time is plotted on the horizontal axis of each chart.

Next, a fourth embodiment of the invention shall be described. FIGS. 16A through 16G are timing charts depicting operation when the display device according to the present embodiment is switched from a narrow-angle display to a wide-angle display, wherein time is plotted on the horizontal axis of each chart. FIG. 16A has the haze (HAZE: haze value) of the transparent/scattering state switching element plotted on the vertical axis, FIG. 16B has the emission luminosity of the white LED plotted on the vertical axis, FIG. 16C has the emission luminosity of the bluish white LED plotted on the vertical axis, FIG. 16D has the frontal luminance of light prior to entering the transparent/scattering switching element plotted on the vertical axis, FIG. 16E has the chromaticity coordinate (x, y) values of light prior to entering the transparent/scattering switching element plotted on the vertical axis, FIG. 11F has the frontal luminance of light after entering the transparent/scattering switching element plotted on the vertical axis, and FIG. 11G has the chromaticity coordinate (x, y) values of light after entering the transparent/scattering switching element plotted on the vertical axis.

The present embodiment is the same as in the above-described third embodiment in terms of the design of the light source device, display device, terminal device, and light source unit. The present embodiment differs, however, in terms of the method of driving the light source device, and in particular the lighting status of the light source. In the third embodiment described previously, only the white LEDs are lit during a narrow-angle display, with the bluish white LEDs being extinguished; while both the white LEDs and the bluish white LEDs are lit during a wide-angle display. Thus, the bluish white LED emission luminosity is zero in a narrow-angle display. In the method of driving the light source device according to this embodiment, on the other hand, the bluish white LEDs are lit in a narrow-angle display as well.

Figure 16B:
Figure 16C:
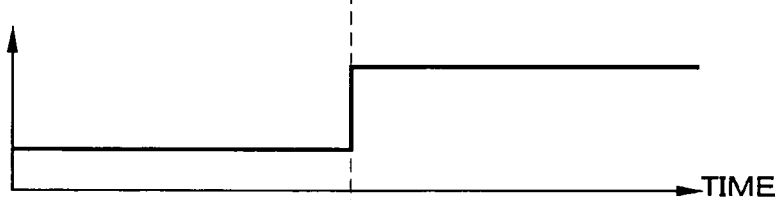
Figure 16D:
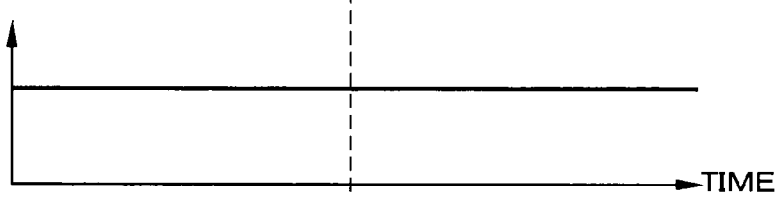

Specifically, in the present embodiment, as shown in FIG. 16A to 16C, the bluish white LEDs 52 are lit even during a narrow-angle display up to time t1. However, the quantity of light from the bluish white LEDs 52 at this time is less than the quantity of light during a wide-angle display starting at time t1, and the quantity of light from the bluish white LEDs 52 increases in association with the increase in haze of the transparent/scattering switching element during switching from a narrow-angle display to a wide-angle display. In the present embodiment, the proportion of light emitted from the bluish white LEDs 52 to total emitted light during a wide-angle display is greater than the emission proportion in the third embodiment described previously.

Figure 16E:
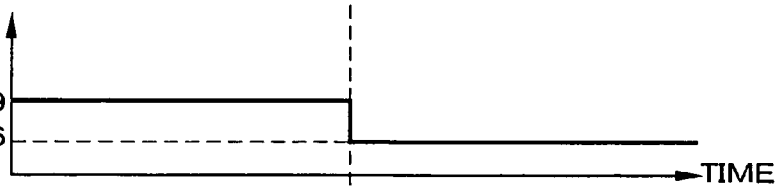
Figure 16F:
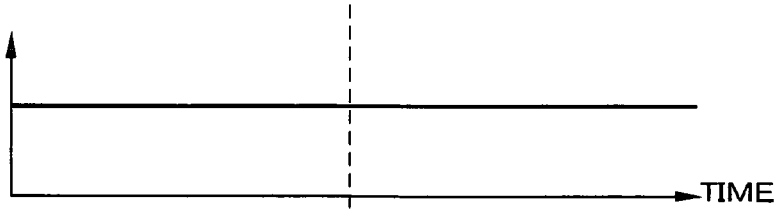

The bluish white LEDs 52 are thereby lit to some extent in addition to the white LEDs 51 during a narrow-angle display up to time t1, as shown in FIG. 16E. Therefore, the chromaticity coordinates of light prior to entering the transparent/scattering switching element have values of (x, y)=(0.29, 0.29), which are smaller than the chromaticity coordinates of the white LEDs 52. During a wide-angle display starting at time t1, on the other hand, the quantity of light of the bluish white LEDs 52 increases, and the light therefore has chromaticity coordinates (x, y)=(0.26, 0.26), acquiring a bluish hue.

Figure 16G:
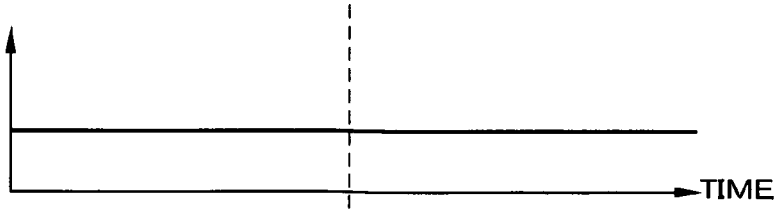

As shown in FIG. 16G, light after entering the transparent/scattering switching element has chromaticity coordinates (x, y)=(0.30, 0.30) and is essentially white in a narrow-angle display mode up to time t1, as noted previously. On the other hand, the transparent/scattering switching element is in a scattering state and produces more scattering of short-wavelength light during a wide-angle display starting at time t1, but since the light entering the transparent/scattering switching element contains more short-wavelength light, the light stays essentially white at (x, y)=(0.30, 0.30). That is, the chromaticity coordinates of light emitted from the transparent/scattering switching element can be kept the same between the narrow-angle display mode up to time t1 and the wide-angle display mode starting at time t1. It is thereby possible to reduce the phenomenon of a yellowish appearance of the display and the resultant unpleasantness for the user when a switch is made from a narrow-angle display mode to a wide-angle display mode.

According to the present embodiment, since the bluish white LEDs are not extinguished completely during a narrow-angle display, irregular luminance on the display screen can be reduced, and high image quality becomes possible. The operation and effects of this fourth embodiment are otherwise analogous to those of the third embodiment described previously.

Figure 17:
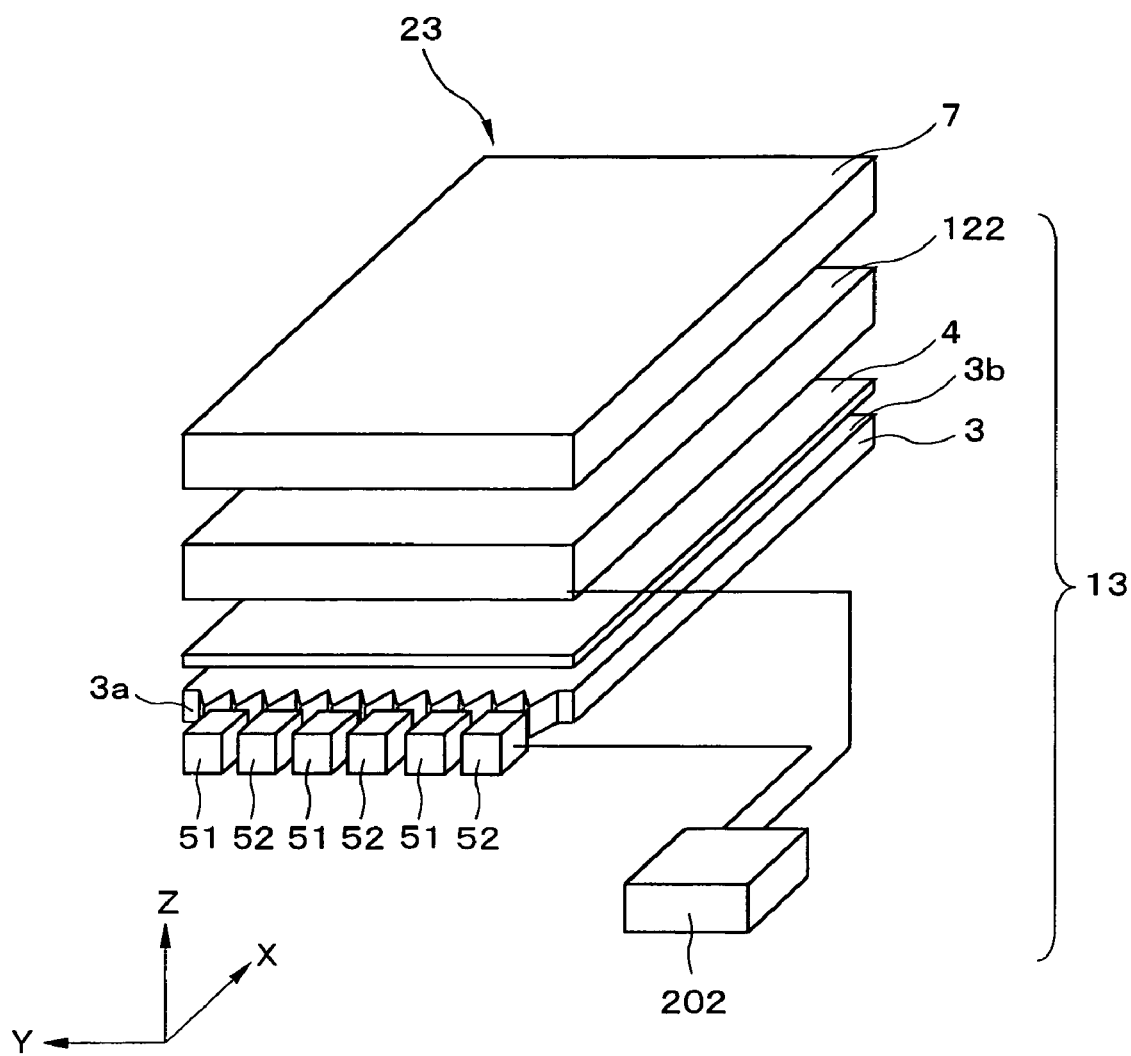
FIG. 17 is a perspective view showing the display device according to a fifth embodiment of the invention.

Next, a fifth embodiment of the invention shall be described. FIG. 17 is a perspective view showing the display device according to the present embodiment of the invention. As shown in FIG. 17, as compared to the display device 2 and the light source device 1 according to the first embodiment described previously, the display device 22 and the light source device 13 according to this fifth embodiment differ in that a control circuit 202 is provided in place of the control circuit 201. As noted, the control circuit 201 adjusts the quantity of light of the white LEDs 51 and the bluish white LEDs 52 by controlling the amount of current. The control circuit 202 also adjusts the quantity of light through pulse width modulation of the electric current. Specifically, the circuit increases the quantity of emitted light by lengthening the time interval of electric current pulses applied to the white LEDs 51 and the bluish white LEDs 52, and reduces the quantity of emitted light by shortening this time interval. In other respects the present embodiment is similar to the first embodiment described previously.

With an LED of a type composed of a blue LED and a yellow phosphor, the yellow phosphor is excited by a portion of the blue light emitted from the blue LED, and emits yellow light, with the blue light and yellow light mixing to produce white light. Therefore, the proportion of light emission of blue light and yellow light may fluctuate when changes are induced in the quantity of light of the white LEDs and the bluish white LEDs by variations in the amount of electric current between a narrow-angle display and a wide-angle display.

In contrast to this, since the quantity of light is adjusted by pulse modulation in the present embodiment, adjustment of the quantity of light can be accomplished by adjusting the proportion of time over which light is emitted. Consequently, it is possible to reduce fluctuation in the proportion of light emission of blue light and yellow light, and to reduce fluctuation of the white balance. The operation and effects of this fifth embodiment are otherwise analogous to those of the first embodiment described previously.

Figure 18:
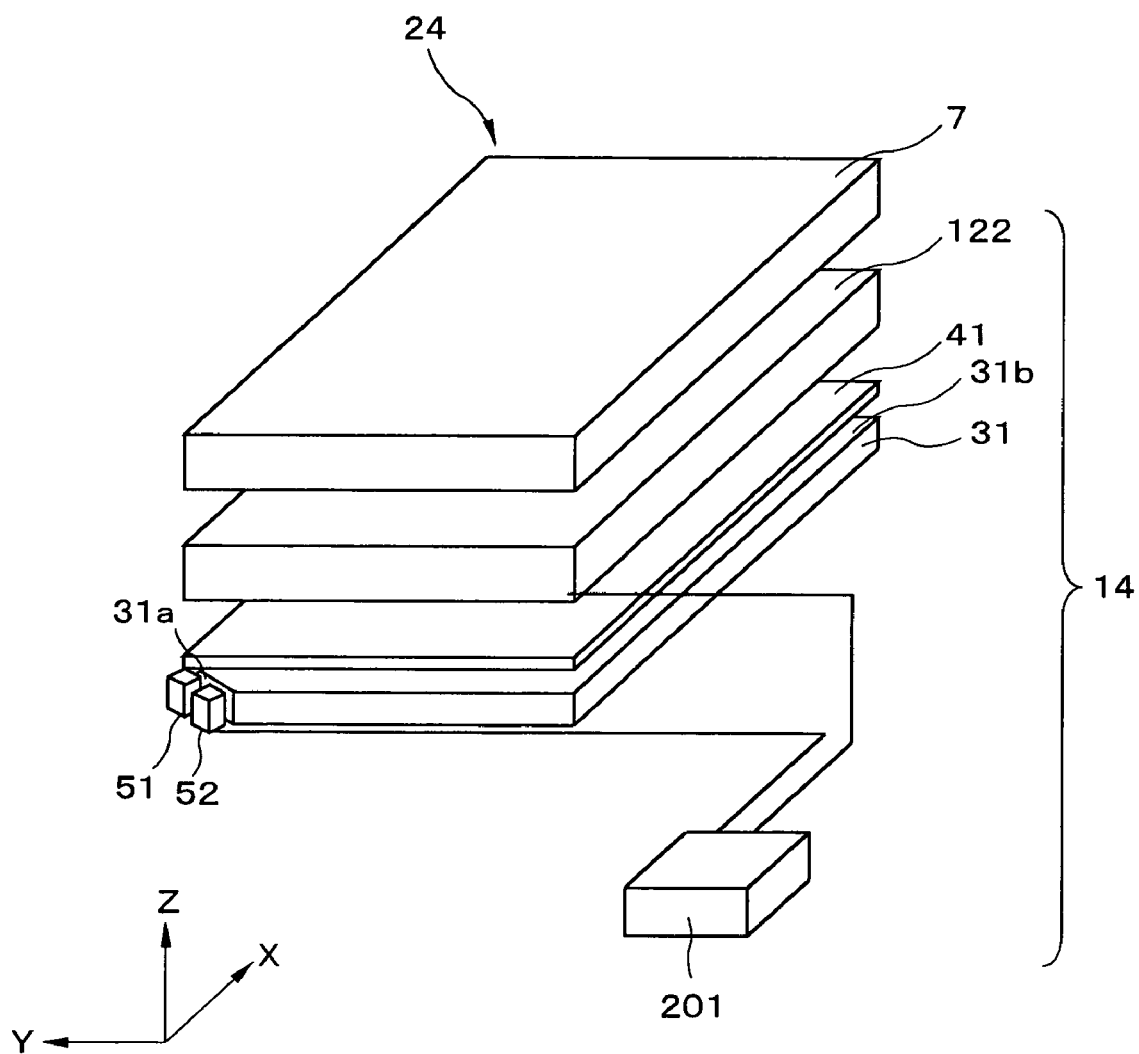
FIG. 18 is a perspective view showing the display device according to a sixth embodiment of the invention.
Figure 19:
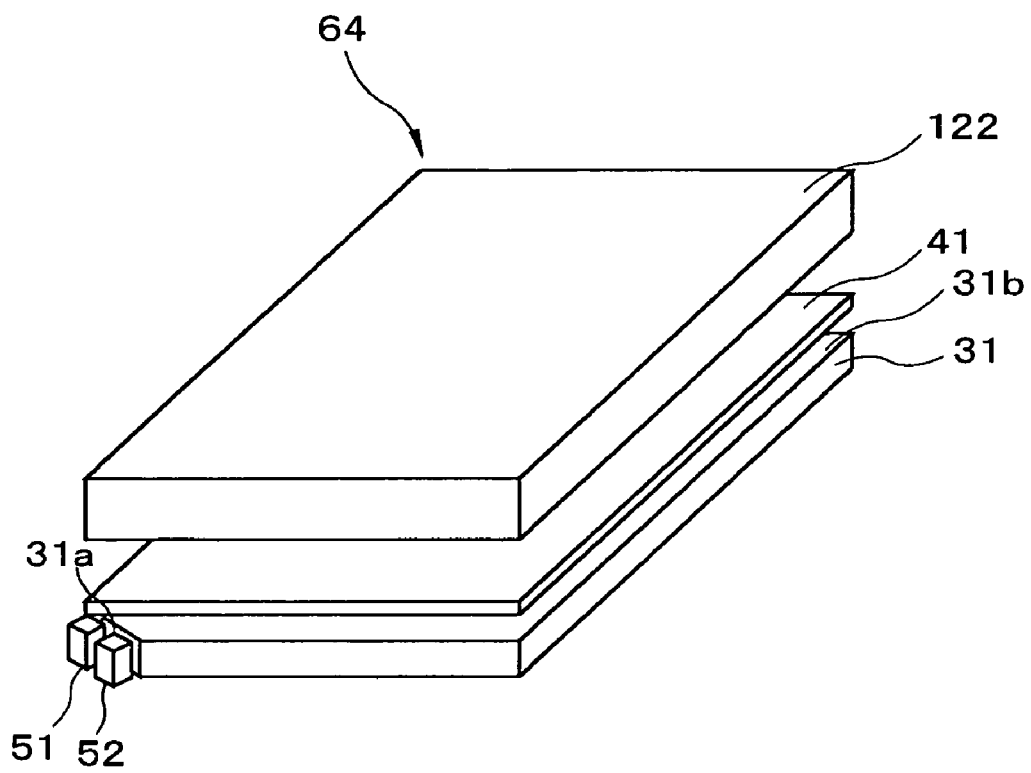
FIG. 19 is a perspective view showing a light source unit as a constituent element thereof.
Figure 20:
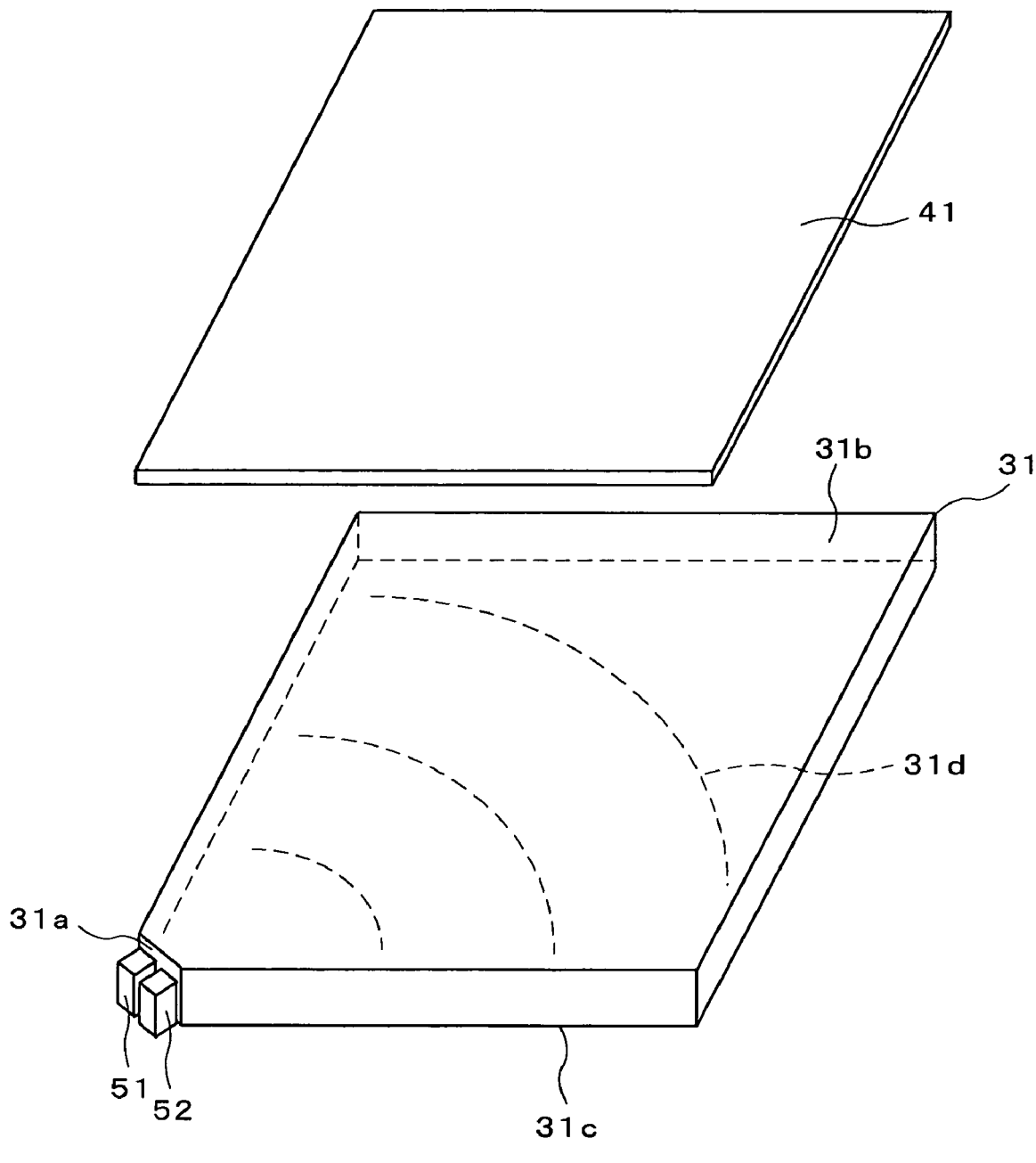
FIG. 20 is a perspective view showing a light source, light-guide plate, and optical film as constituent elements of the light source unit.
Figure 21:
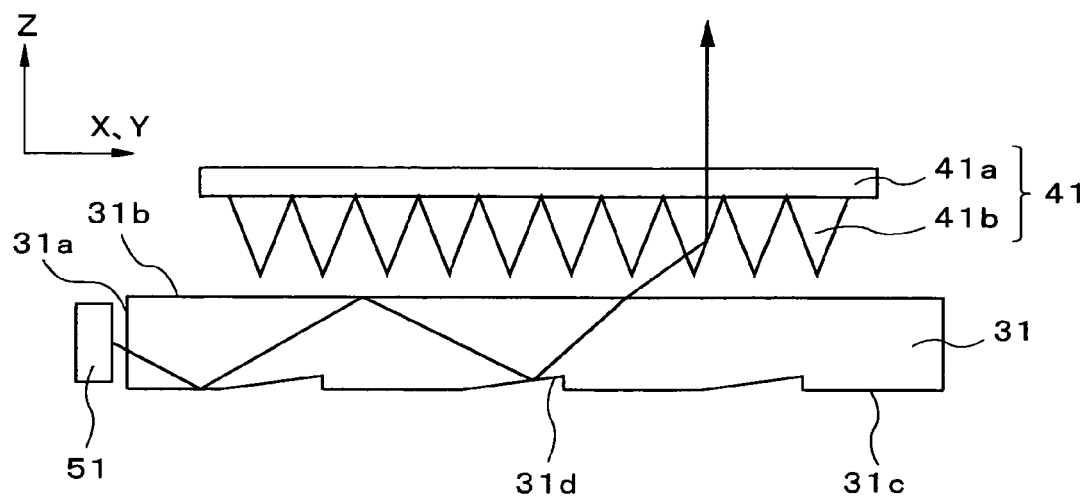
FIG. 21 is a sectional view showing a light source, light-guide plate, and optical film as constituent elements of the light source unit.

Next, a sixth embodiment of the invention shall be described. FIG. 18 is a perspective view showing the display device according to this embodiment; FIG. 19 is a perspective view showing a light source unit as a constituent element thereof; FIG. 20 is a perspective view showing a light source, light-guide plate, and optical film as constituent elements of the light source unit; and FIG. 21 is a sectional view thereof.

As shown in FIGS. 18 to 21, as compared to the display device 2, the light source device 1, and the light source unit 6 according to the first embodiment described previously, the display device 24, light source device 14, and light source unit 64 according to this sixth embodiment differ by being provided with a light-guide plate 31 in place of the light-guide plate 3, and being provided with an optical film 41 in place of the optical film 4. One white LED 51 and one bluish white LED 52 are disposed in a corner of the light-guide plate 31.

As shown in FIG. 20, the light-guide plate 31 in the display device of the present embodiment is formed with a generally rectangular plate shape from a transparent resin such as methacrylate resin, and has an inclined surface 31d formed on a light-diffusing surface 31c. Viewed from the Z-axis direction, of the four corner portions of the light-guide plate 31, the corner of the corner portion having the smallest X coordinate and Y coordinate is cut off on the diagonal, with this cut face constituting a light-incident surface 31a. The one white LED 51 and one bluish white LED 52 are disposed at locations facing this light-incident surface 31a. The direction of the normal line of the light-incident surface 31a is a direction orthogonal to the Z-axis direction, and intersecting both the X-axis direction and Y-axis direction.

Viewed from the Z-axis direction, the inclined surface 31d formed on the light-diffusing surface 31c of the light-guide plate 31 is arranged in a concentric circle pattern, centered on the location of the corner that was cut off to form the light-incident surface 31a (hereinafter termed the "virtual corner point"). Specifically, the inclined surface 31d spreads in a fan shape centered on the virtual corner point, with the outer edge thereof extending in arcuate shape centered on the virtual corner point. Viewed from the Z-axis direction, the direction of maximum incline of each inclined surface 31d location is the direction going towards the virtual corner point from that location. The virtual corner point corresponds to the center point of the white LED 51 and the bluish white LED 52.

As shown in FIG. 21, in the optical film 41 there are formed a plurality of primary prism elements 41b situated on the light-guide plate 31 side of a flat plate portion 41a. The primary prism elements 41b extend in an arcuate shape centered on the virtual corner point, with the primary prism elements 41b being arranged in a concentric circle pattern centered on the virtual corner point. In other respects the present embodiment is similar to the first embodiment described previously.

Next, operation of the present embodiment constituted in the above manner shall be described. As shown in FIG. 21, light emitted from the white LED 51 and the bluish white LED 52 enters the light-guide plate 31 from the light-incident surface 31a. Light entering the light-guide plate 31 from the light-incident surface 31a, while spreading out radially with the virtual corner point as the center, advances through the light-guide plate 31 while being totally reflected between the light-emitting surface 31b and the light-diffusing surface 31c of the light-guide plate 31. Each time that this light is reflected by the inclined surface 31d, the angle of incidence of the light on the light-emitting surface 31b decreases, until the light exits to the outside of the light-guide plate 31 via the light-emitting surface 31b at the point in time that this angle of incidence becomes smaller than the critical angle.

At this time, the direction of maximum incline at each inclined surface 31d location is the direction going towards the aforementioned virtual corner point from each location, as viewed from the Z-axis direction. Therefore, there is no change in the direction of advance of the light when viewed from the Z-axis direction despite the light being reflected by the inclined surface 31d. Accordingly, light emitted from the light-emitting surface 31b of the light-guide plate 31 has high directivity in relation to the direction that connects the virtual corner point and the light exit location on the light-emitting surface 31b, but has low directivity in relation to the direction orthogonal to this direction.

This light then undergoes refraction and total reflection within the primary prism elements 41b of the optical film 41, is deflected in the +Z direction, exits the optical film 41 with high directivity in the +Z direction, and is incident on the transparent/scattering switching element 122. Subsequent operation is the same as in the first embodiment described previously.

According to the present embodiment, the white LED and the bluish white LED as light sources can be disposed in a relatively narrow area at one corner of the light-guide plate. By so doing, irregular luminance and irregular color during switching the quantity of light of the bluish white LED can be reduced. The operation and effects of this sixth embodiment are otherwise analogous to those of the first embodiment described previously.

Figure 22:
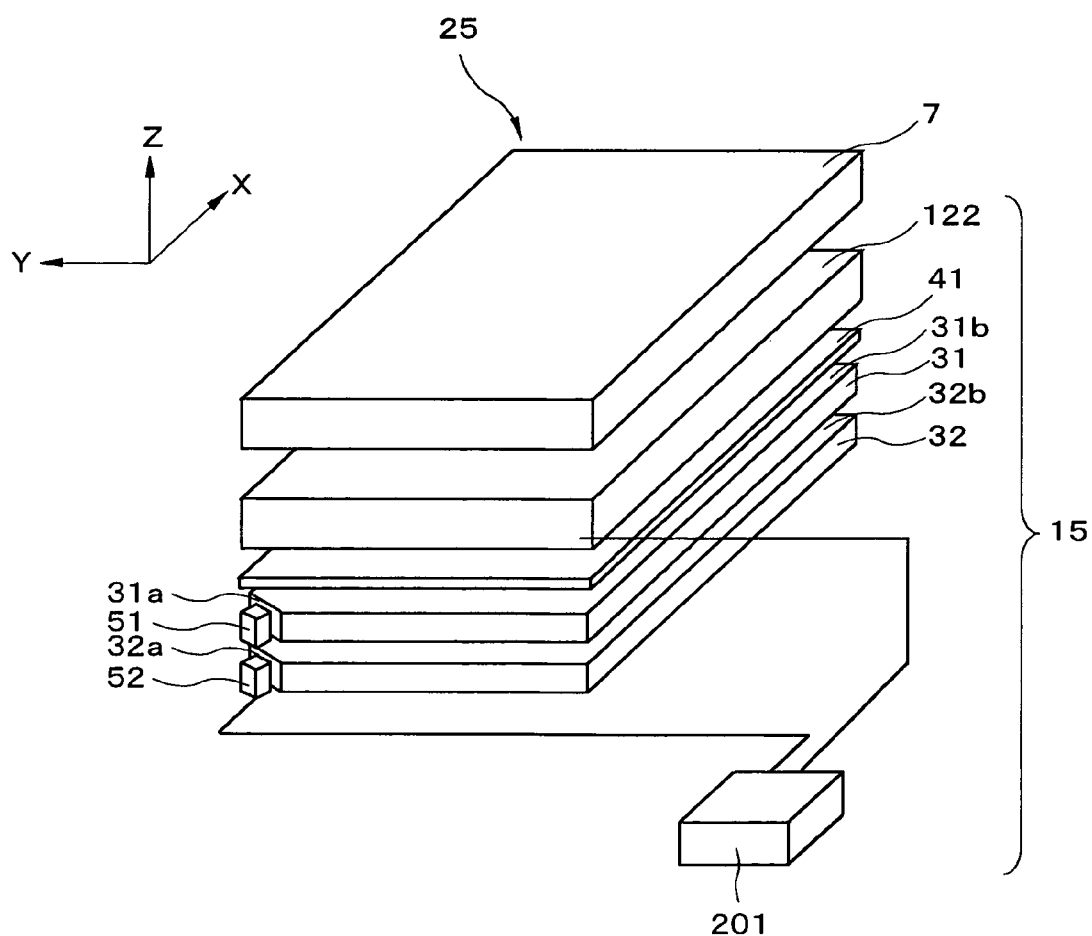
FIG. 22 is a perspective view showing the display device according to a seventh embodiment of the invention.
Figure 23:
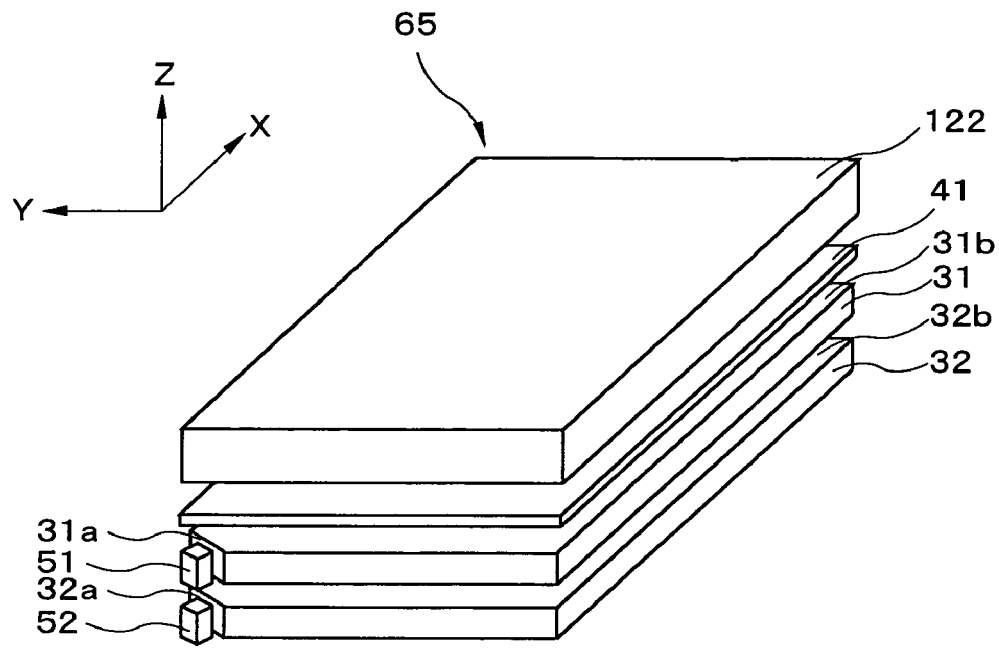
FIG. 23 is a perspective view showing a light source unit as a constituent element thereof.
Figure 24:
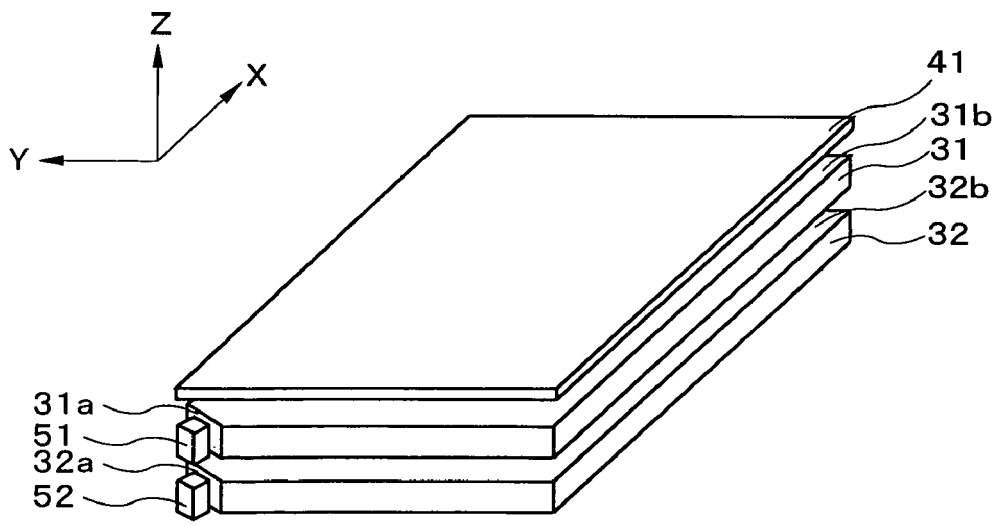
FIG. 24 is a perspective view showing a light source, light-guide plate, and optical film as constituent elements of the light source unit.
Figure 25:
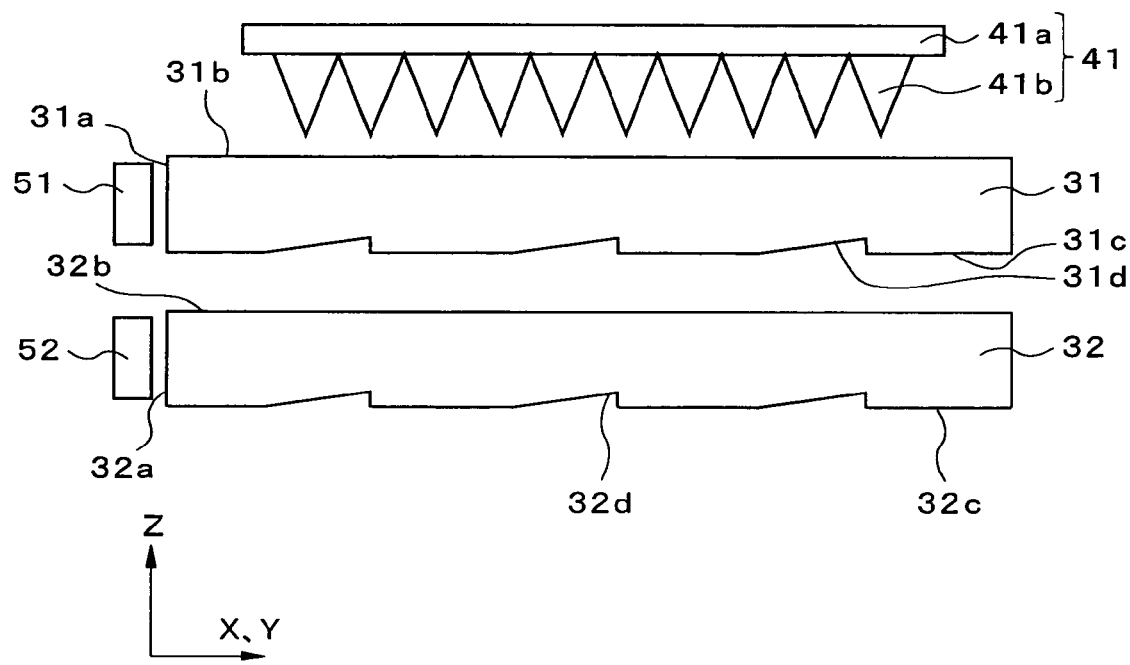
FIG. 25 is a sectional view showing a light source, light-guide plate, and optical film as constituent elements of the light source unit.

Next, a seventh embodiment of the invention shall be described. FIG. 22 is a perspective view showing the display device according to this embodiment; FIG. 23 is a perspective view showing a light source unit as a constituent element thereof; FIG. 24 is a perspective view showing a light source, light-guide plate, and optical film as constituent elements of the light source unit; and FIG. 25 is a sectional view thereof.

As shown in FIGS. 22 to 25, as compared to the display device 24, light source device 14, and light source unit 64 according to the sixth embodiment described previously, the display device 25, light source device 15, and light source unit 65 according to the seventh embodiment differ by being provided with a light-guide plate 32 in addition to the light-guide plate 31. The light-guide plate 32 is arranged parallel to the light-guide plate 31 and spaced apart to the −Z axis side of the light-guide plate 31, and a white LED 51 is disposed in a corner portion of the light-guide plate 31, while a bluish white LED 52 is disposed in a corner portion of the light-guide plate 32. The white LED 51 and the bluish white LED 52 are situated at the same location, viewed from the Z-axis direction.

As shown in FIG. 24, the constitution of the light-guide plate 32 is the same as that of the light-guide plate 31. Specifically, an inclined surface 31d is formed on the light-diffusing surface 31c of the light-guide plate 31, a light-incident surface 31a is formed in one corner portion of the light-guide plate 31, and the white LED 51 is disposed at a location facing this light-incident surface 31a. The inclined surface 31d spreads over a fan-shaped area centered on the white LED 51, and is arrayed in an arcuate shape centered on the white LED 51. The direction of maximum incline of each inclined surface 31d location is coincident with the direction going towards the white LED 51 from each location.

Similarly, an inclined surface 32d is formed on the light-diffusing surface 32c of the light-guide plate 32, a light-incident surface 32a is formed in one corner portion of the light-guide plate 32, and the bluish white LED 52 is disposed at a location facing this light-incident surface 32a. The inclined surface 32d spreads over a fan-shaped area centered on the bluish white LED 52, and is arrayed in an arcuate shape centered on the bluish white LED 52. The direction of maximum incline of each inclined surface 32d location is coincident with the direction going towards the bluish white LED 52 from each location. In other respects, this embodiment is analogous to the sixth embodiment described previously.

Next, operation of the present embodiment constituted in the above manner shall be described. Operation up to the point that the light of the white LED 51 exits from the light-guide plate 31, and operation up to the point that the light of the bluish white LED 52 exits from the light-guide plate 32, are each analogous to the sixth embodiment described previously.

Specifically, light emitted from the white LED 51 enters the light-guide plate 31 from the light-incident surface 31a. The light that has entered the light-guide plate 31 from the light-incident surface 31a, while spreading out radially within the light-guide plate 31, advances through the light-guide plate 31 while being totally reflected between the light-emitting surface 31b and the light-diffusing surface 31c of the light-guide plate 31. Each time that light incident on the light-diffusing surface 31c of the light-guide plate 31 is reflected by the inclined surface 31d, its angle of incidence on the light-emitting surface 31b decreases, and thus light incident on the light-emitting surface 31b at a smaller angle than the critical angle exits to outside the light-guide plate 31. The light emitted from the light-emitting surface 31b of the light-guide plate 31 has high directivity in relation to the direction connecting the white LED 51 with the light exit location on the light-emitting surface 31b, but has low directivity in relation to the direction orthogonal to this direction.

Similarly, light emitted from the bluish white LED 52 enters the light-guide plate 32 from the light-incident surface 32a. The light that has entered the light-guide plate 32 from the light-incident surface 32a, while spreading out radially within the light-guide plate 32, advances through the light-guide plate 32 while being totally reflected between the light-emitting surface 32b and the light-diffusing surface 32c of the light-guide plate 32. Each time that light incident on the light-diffusing surface 32c of the light-guide plate 32 is reflected by the inclined surface 32d, the angle of incidence of the light on the light-emitting surface 32b decreases, and thus light incident on the light-emitting surface 32b at a smaller angle than the critical angle exits to outside the light-guide plate 32. The light emitted from the light-emitting surface 32b of the light-guide plate 32 has high directivity in relation to the direction that connects the bluish white LED 52 and the light exit location on the light-emitting surface 32b, but has low directivity in relation to the direction orthogonal to this direction. While the light enters the light-guide plate 31 from the light-diffusing surface 31c of the light-guide plate 31, substantially all of the light is output unchanged from the light-emitting surface 31b of the light-guide plate 31, with high directivity in the diagonal direction.

Light emitted from the light-guide plate 31 with small spread and high directivity undergoes refraction and total reflection by the primary prism elements 41b of the optical film 41 and is deflected in the +Z direction, and is output with high directivity in the +Z direction, whereupon it enters the transparent/scattering switching element 122. Subsequent operation is analogous to that in the first embodiment described previously.

According to the present embodiment, since the white LED and the bluish white LED can be disposed respectively on two light-guide plates arranged spaced apart in the Z-axis direction, these two types of LEDs can be disposed in a stacked configuration at identical locations on the light-guide plates. Thus, as compared to the sixth embodiment described previously, irregular luminance and irregular color during switching of the quantity of light of the bluish white LED can be reduced effectively. The operation and effects of this seventh embodiment are otherwise analogous to those of the sixth embodiment described previously.

Figure 26:
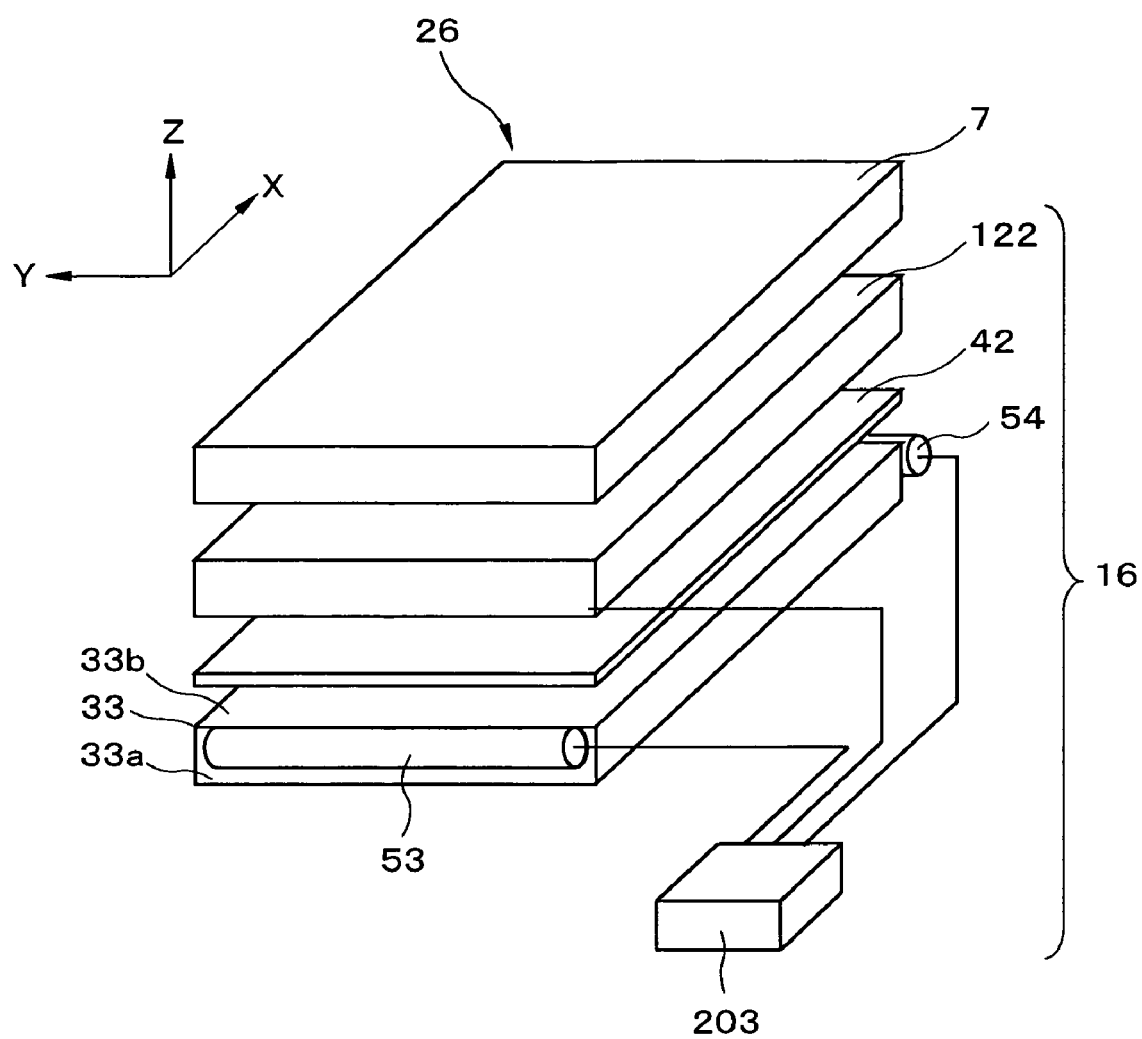
FIG. 26 is a perspective view showing the display device according to an eighth embodiment of the invention.
Figure 27:
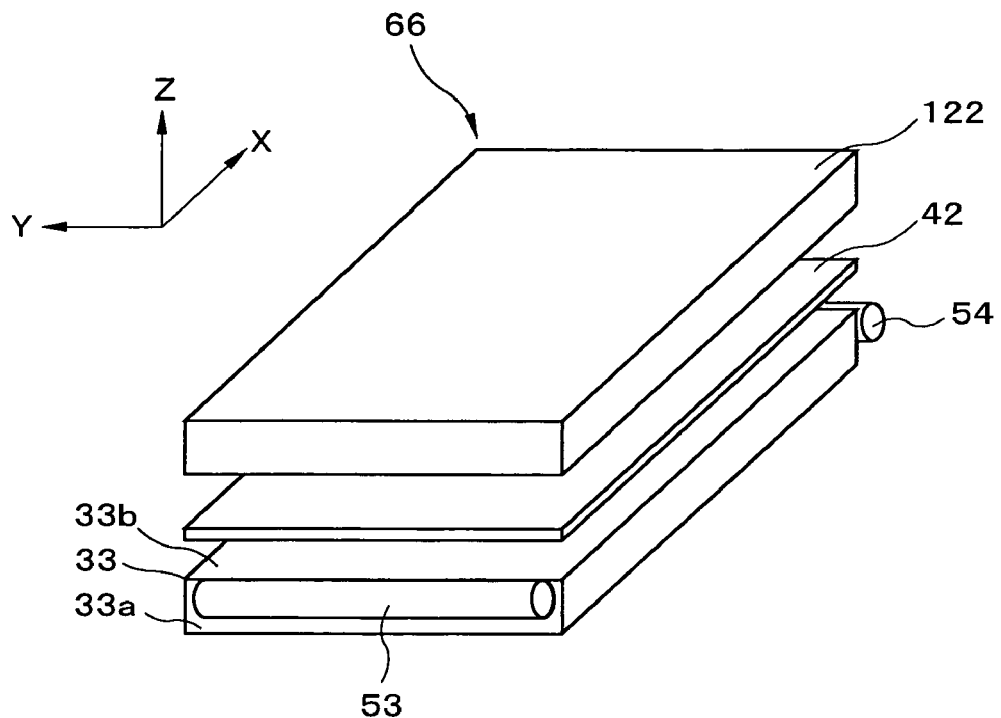
FIG. 27 is a perspective view showing a light source unit as a constituent element thereof.
Figure 28:
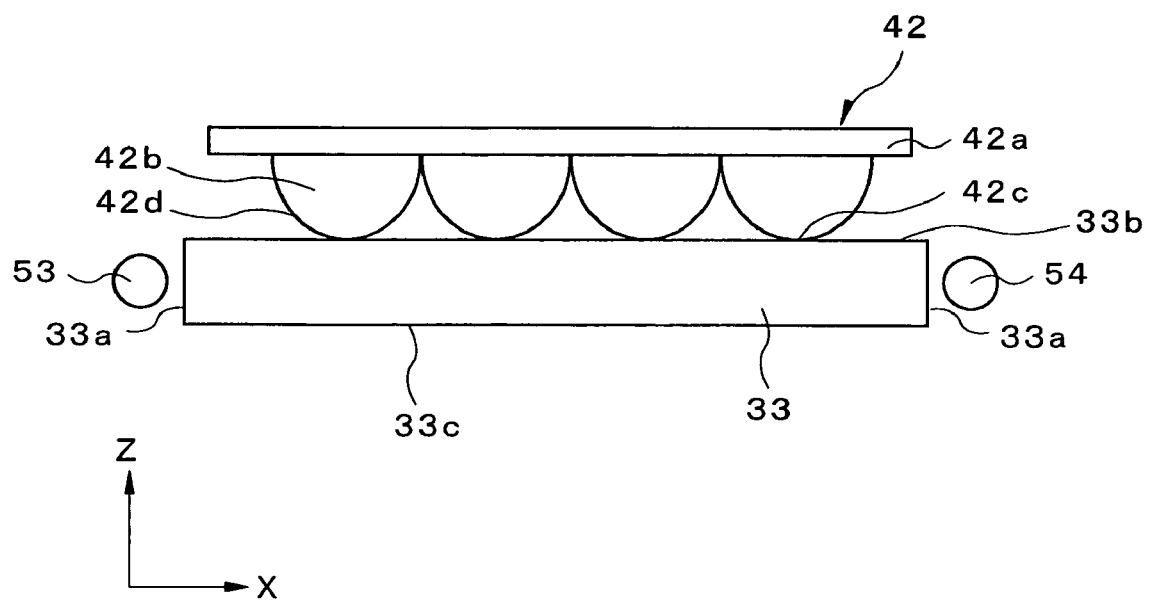
FIG. 28 is a sectional view showing a light source, light-guide plate, and optical film as constituent elements of the light source unit.
Figure 29:
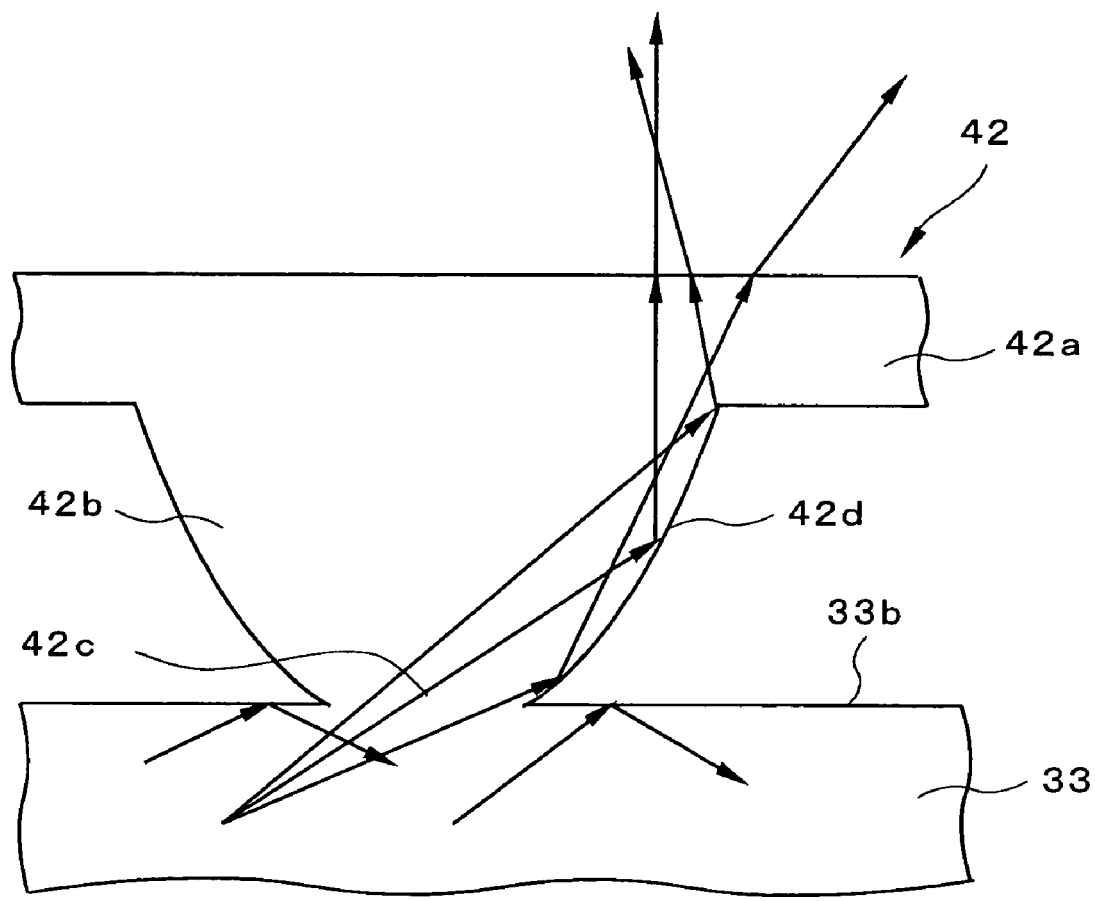
FIG. 29 is a partly enlarged sectional view depicting the behavior of light in proximity to a convex portion of the optical film.
Figure 30:
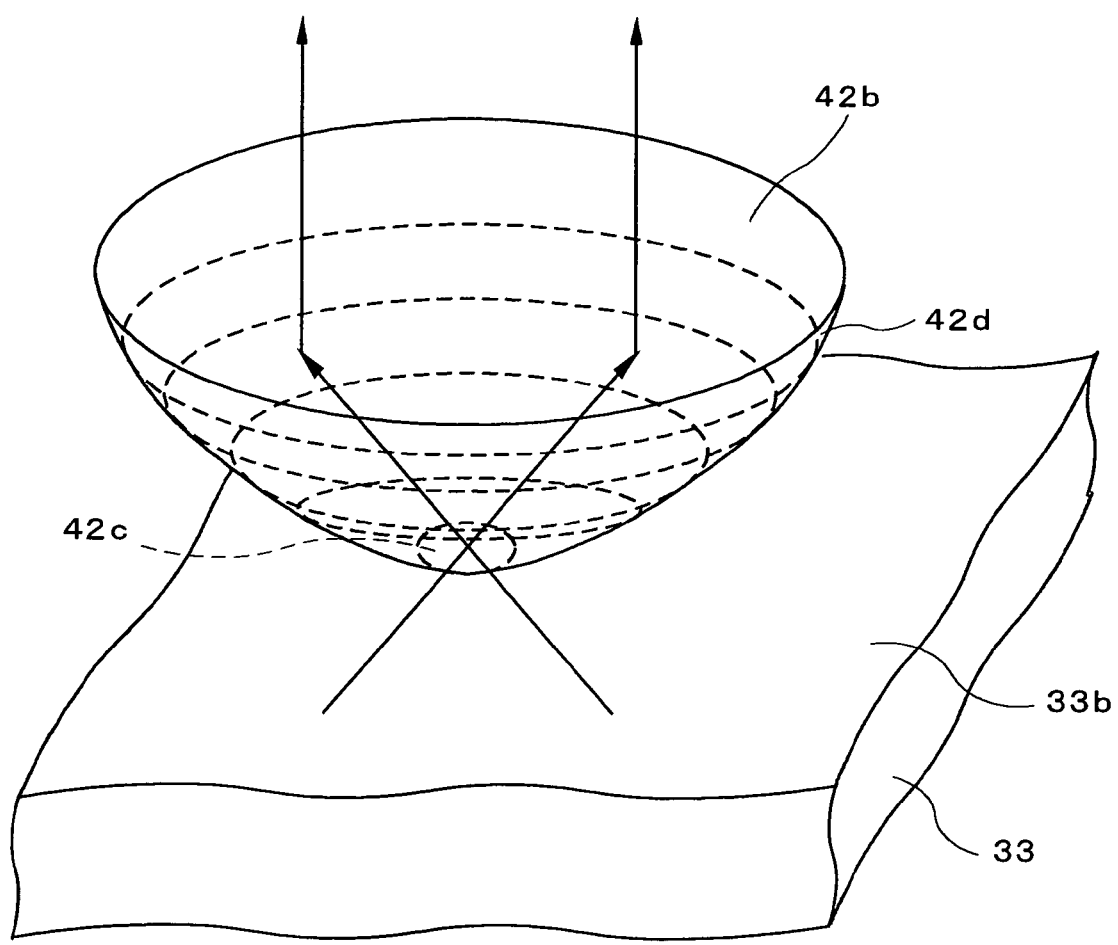
FIG. 30 is a perspective view showing the convex portion of the optical film.
Figure 31:
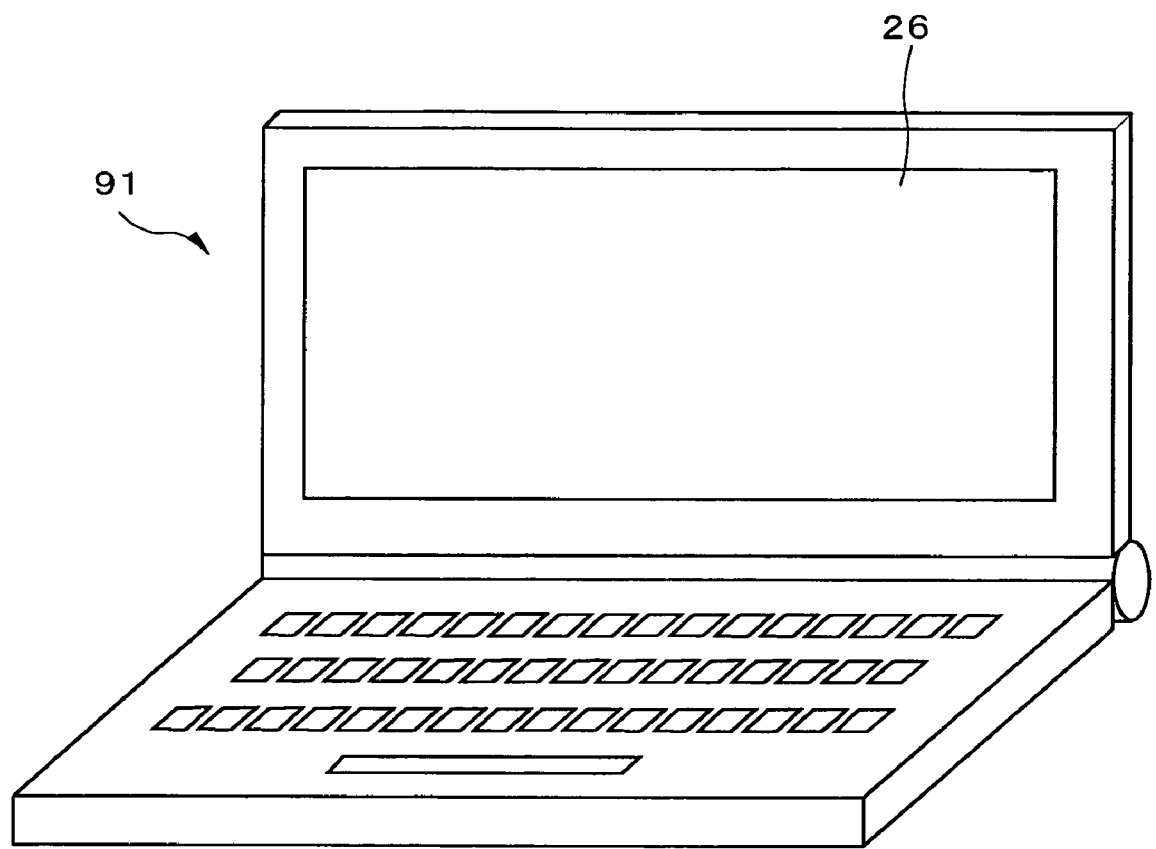
FIG. 31 is a perspective view showing the terminal device according to the present embodiment.

Next, a light source device, a display device, a terminal device, a light source unit, and a method for driving the light source device according to an eighth embodiment of the invention shall be described. FIG. 26 is a perspective view showing the display device according to an eighth embodiment of the invention; FIG. 27 is a perspective view showing a light source unit as a constituent element thereof; FIG. 28 is a sectional view showing a light source, light-guide plate, and optical film as constituent elements of the light source unit; FIG. 29 is a partly enlarged sectional view depicting the behavior of light in proximity to a convex portion of the optical film; FIG. 30 is a perspective view showing a convex portion of the optical film; and FIG. 31 is a perspective view showing the terminal device according to the present embodiment.

As shown in FIGS. 26 to 28, as compared to the display device 2, the light source device 1, and the light source unit 6 according to the first embodiment described previously, the display device 26, light source device 16, and light source unit 66 according to this eighth embodiment differ by having a light-guide plate 33 in place of the light-guide plate 3; a optical film 42 in place of the optical film 4; a white cold cathode fluorescent lamp 53 and a bluish white cold cathode fluorescent lamp 54 as the light source, instead of the white LED 51 and bluish white LED 52 described in the first embodiment; and a control circuit 203 in place of the control circuit 201.

The white cold cathode fluorescent lamp 53 and the bluish white cold cathode fluorescent lamp 54 are situated respectively to the +X direction side and the −X direction side of the light-guide plate 33. The side faces of the light-guide plate 33 on the +X direction side and the −X direction side thereof constitute a light-incident face 33a for receiving the light emitted from the white cold cathode fluorescent lamp 53 and the bluish white cold cathode fluorescent lamp 54 respectively. This light-incident face 33a does not have a diffusion pattern such as the pattern on the light-guide plate 3 in the first embodiment described previously (see FIG. 4). The bluish white cold cathode fluorescent lamp 54 employs more blue phosphors than does the white cold cathode fluorescent lamp 53, so that the cold cathode fluorescent lamp emits bluish white light. The control circuit 203 drives the cold cathode fluorescent lamps, rather than LEDs.

As shown in FIGS. 28 and 29, in contrast to the light-guide plate 3 of the first embodiment described previously, the light-guide plate 33 of the present embodiment lacks an inclined surface on the light-diffusing surface 33c. The optical film 42 is furnished with a flat plate portion 42a, and the light-guide plate 33 side of this flat plate portion 42a, i.e., the −Z direction side thereof, is provided with a plurality of projections 42b. The shape of the projection 42b is a shape that includes part of a sphere or elliptical sphere, and the apical portion 42c thereof is in intimate contact optically with the light-emitting surface 33b of the light-guide plate 33. The side faces that skirt the apical portion 42c of the projection 42b constitute reflecting surfaces 42d for reflecting the light that has exited the light-emitting surface 33b of the light-guide plate 33 and passed through the apical portion 42c into the projection 42b, so that the light is directed in the frontal direction (+Z direction). A cross sectional shape obtained by cutting the reflecting surfaces 42d in the XY plane is a partial circle or partial ellipse.

As shown in FIG. 30, the display device according to the present embodiment is installed in a notebook-type computer, for example. That is, the terminal device according to the present embodiment is a notebook-type computer 91. Other aspects in the present embodiment are similar to those in the first embodiment described previously.

Next, operation of the light source device 16 of the present embodiment constituted in the above manner shall be described. As an example of operation, operation in the case in which the white cold cathode fluorescent lamp 53 is lit shall be described. Light emitted from the white cold cathode fluorescent lamp 53 enters the light-guide plate 33 from the light-incident surface 33a and propagates in the +X direction through the light-guide plate 33. In cases in which light propagating through the light-guide plate 33 is radiated onto an area of the light-emitting surface 33b that is not in contact with the apical portion 42c of a projection 42b on the optical film 42, the light is totally reflected at the light-emitting surface 33b and continues to propagate within the light-guide plate 33. On the other hand, in cases in which light propagating through the light-guide plate 33 is radiated onto an area of the light-emitting surface 33b that is in contact with an apical portion 42b, the light is guided into the projection 42b via the apical portion 42c, reflected by the reflecting surfaces 42d which constitute the inside surfaces of the projection 42b, and exits in a direction close to the +Z direction. Similar to the reflection at the inside surfaces of the primary prism elements in the first embodiment described previously, reflection at the reflecting surfaces 42d represents total reflection utilizing the difference in refractive index between the projection 42b and the air.

Since the reflecting surfaces 42d of the projection 42b are curved surfaces of arcuate cross section in the XY plane, the reflecting surfaces 42d can reflect light emitted by light sources situated at locations spaced apart from one another, so that the light exits in generally the same direction, i.e., towards the +Z direction. That is, not only light emitted by the white cold cathode fluorescent lamp 53, but also light emitted by the bluish white cold cathode fluorescent lamp 54 can be reflected towards the +Z direction. Operation of this eighth embodiment is otherwise analogous to that of the first embodiment described previously.

In the present embodiment, as compared to the first embodiment described previously, cold cathode fluorescent lamps are used instead of LEDs as the light source. Currently, cold cathode fluorescent lamps have higher efficiency than LEDs, and thus are particularly favorable for installation in terminal devices larger than a medium one, rather than in small mobile terminal devices; and when so installed can reduce change in color during viewing angle switching. The effects of this eighth embodiment are otherwise analogous to that of the first embodiment described previously.

Figure 32:
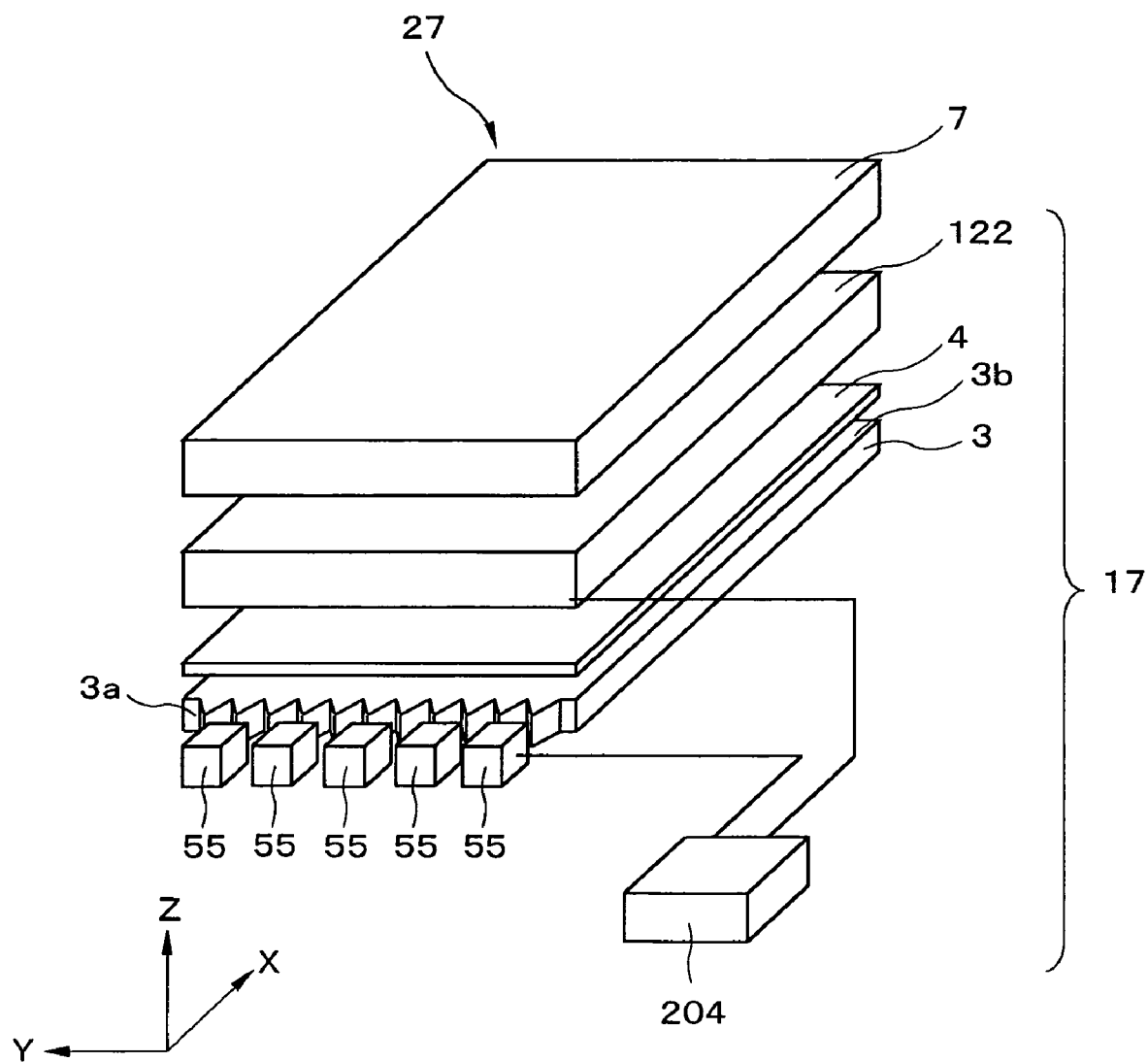
FIG. 32 is a perspective view showing the display device according to a ninth embodiment of the invention.
Figure 33:
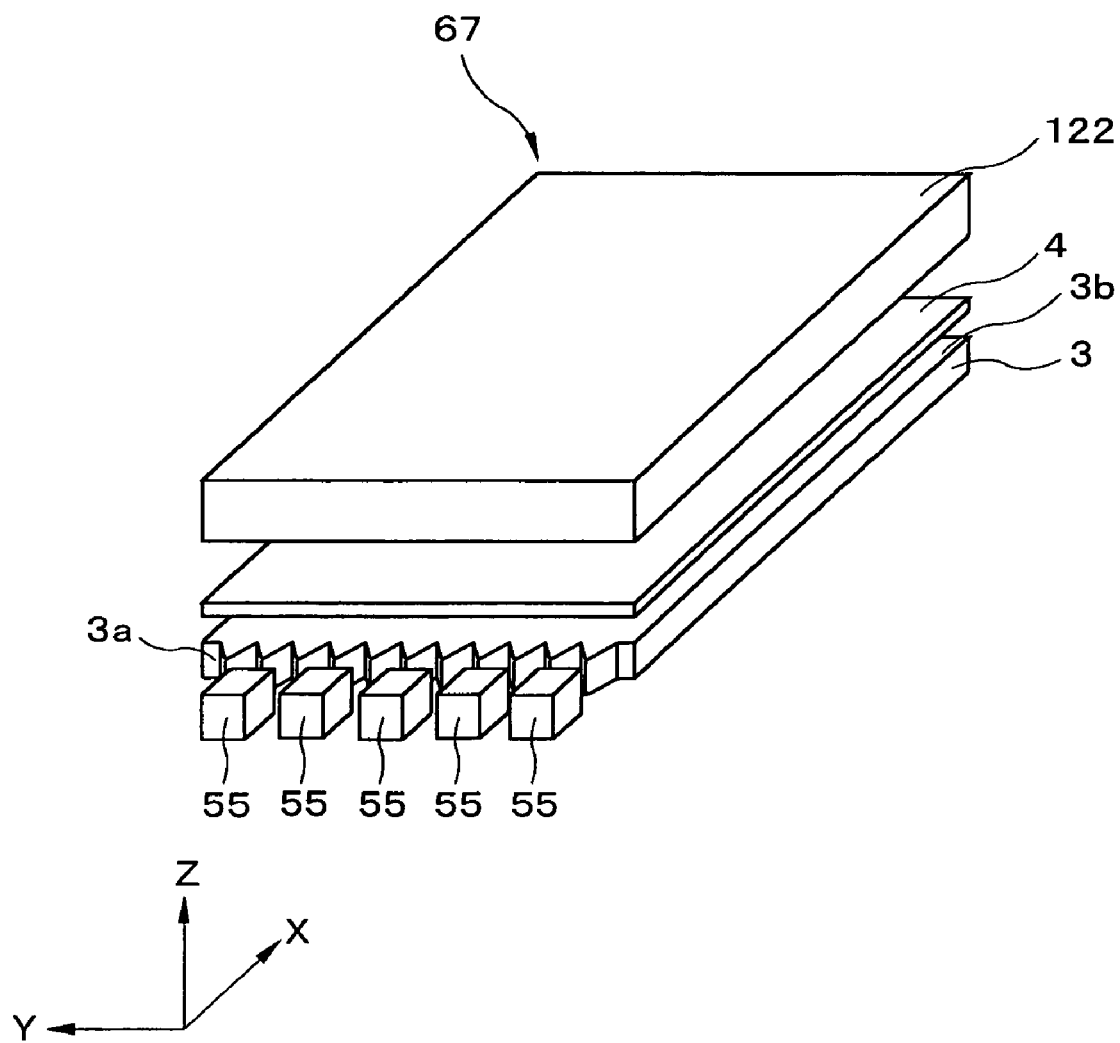
FIG. 33 is a perspective view showing a light source unit as a constituent element thereof.
Figure 34A:
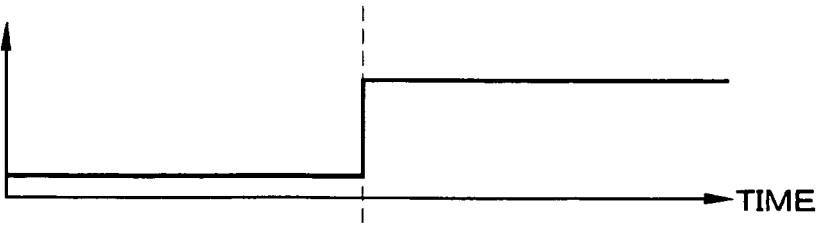
FIGS. 34A through 34F are timing charts depicting operation when the display device according to the present embodiment is switched from a narrow-angle display to a wide-angle display, wherein time is plotted on the horizontal axis of each chart.

Next, a ninth embodiment of the invention shall be described. FIG. 32 is a perspective view showing the display device according to the present embodiment of the invention; FIG. 33 is a perspective view showing a light source unit as a constituent element thereof; and FIGS. 34A through 34F are timing charts depicting operation when the display device according to the present embodiment is switched from a narrow-angle display to a wide-angle display, wherein time is plotted on the horizontal axis of each chart. FIG. 34A has the haze (HAZE: haze value) of the transparent/scattering state switching element plotted on the vertical axis, FIG. 34B has the emission luminosity of the white LED plotted on the vertical axis, FIG. 34C has the frontal luminance of light prior to entering the transparent/scattering switching element plotted on the vertical axis, FIG. 34D has the chromaticity coordinate (x, y) values of light prior to entering the transparent/scattering switching element plotted on the vertical axis, FIG. 34E has the frontal luminance of light after entering the transparent/scattering switching element plotted on the vertical axis, and FIG. 34F has the chromaticity coordinate (x, y) values of light after entering the transparent/scattering switching element plotted on the vertical axis.

As shown in FIGS. 32 and 33, as compared to the display device 2, light source device 1, and light source unit 6 according to the first embodiment described previously, the display device 27, light source device 17, and light source unit 67 according to this ninth embodiment differ in being provided with white LEDs 55 only, and no bluish white LEDs; and in being provided, in place of the control circuit 201, with a control circuit 204 for driving the white LEDs 55.

The white LEDs 55 are LEDs of a type composed of a blue LED and a yellow phosphor that emits yellow light by excitation with the blue light emitted from the blue LED. The white LEDs 55 differ from the white LEDs 51 used in the first embodiment described previously, in that it is possible to vary the chromaticity coordinates of the light emitted from the LED, by varying the quantity of light. Specifically, in cases in which the quantity of light is small, the white LED 55 emits white light of a yellowish hue, but as the quantity of light increases, the LED emits white light of a bluish hue. In other respects the present embodiment is similar to the first embodiment described previously.

Figure 34B:
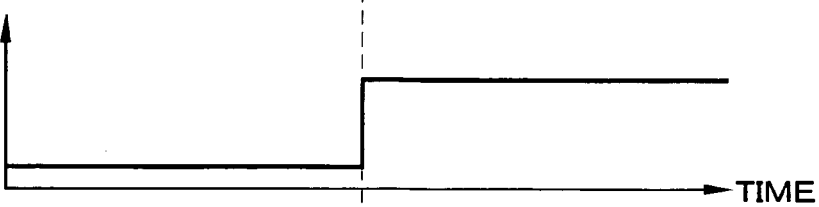
Figure 34C:
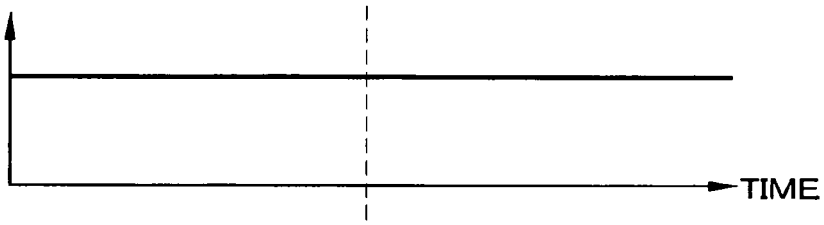
Figure 34D:
Figure 34E:
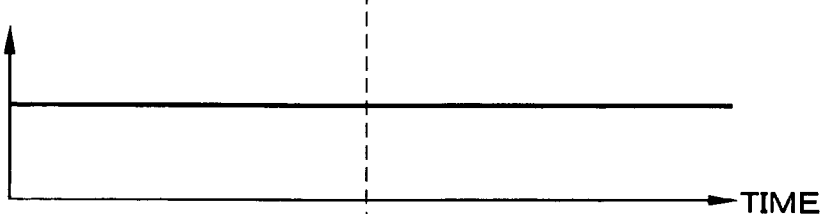

Next, the operation of the present embodiment constituted in the above manner shall be described. As shown in FIG. 34A to 34C, during switching from a narrow-viewing-angle display to a wide-viewing-angle display, haze of the transparent/scattering switching element is increased, in association with which the quantity of light of the white LEDs 55 is increased. At this time, the color appearance changes from white of yellowish hue to white of bluish hue as the quantity of light of the white LEDs 55 increases, as described above. Specifically, as shown in FIG. 34D, the values of the chromaticity coordinates of light incident on the transparent/scattering switching element 122 are (x, y)=(0.31, 0.31) during a narrow-angle display up to time t1, whereas these change to (x, y)=(0.27, 0.27) during a wide-angle display starting at time t1. In the present embodiment, the control circuit 204 controls the white LEDs 55 so that the aforementioned Eqs. 4 to 6 are satisfied.

Figure 34F:
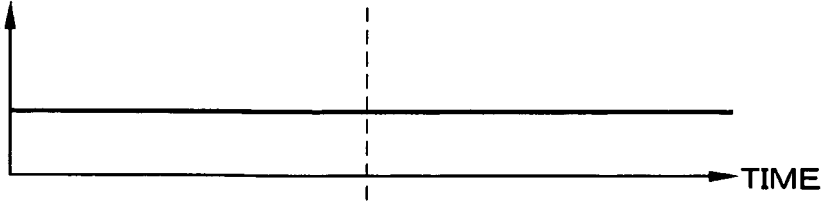

As shown in FIG. 34F, as noted previously, the chromaticity coordinates of the light after exiting the transparent/scattering switching element are (x, y)=(0.31, 0.31) in a narrow-angle display mode up to time t1, and the light is generally white. In a wide-angle display mode starting from time t1, on the other hand, the transparent/scattering switching element assumes the scattering state and scatters more of the short-wavelength light, but the light entering the transparent/scattering switching element now contains more short-wavelength light, as mentioned previously. As a result, the light remains generally white and has the chromaticity coordinates (x, y)=(0.31, 0.31). That is, the chromaticity coordinates of light emitted from the transparent/scattering switching element can be kept the same in both the narrow-viewing-angle display mode up to time t1 and the wide-viewing-angle display mode beginning at time t1. It is thereby possible to reduce the phenomenon whereby the display takes on a yellowish hue unpleasant for the user during switching from a narrow-viewing-angle display mode to a wide-viewing-angle display mode.

Next, the effects of the present embodiment shall be described. In the present embodiment, since only white LEDs 55 of a single type are provided as the light source, and all of the white LEDs 55 are controlled uniformly, all of the white LEDs 55 will emit light at the same luminance during both a wide-angle display and a narrow-angle display. Consequently, irregular luminance will not occur during a narrow-angle display. By so doing, images of high picture quality can be displayed. In the present embodiment, as compared to the first embodiment described previously, change in color during a narrow-angle display can be reduced with a single type of light source, making it possible for the device to be more compact and lower in cost.

While the embodiments described herein may be reduced to practice independently, it is also possible for these embodiments to be worked in suitable combination.

The present invention is suitable for use as the display device of a mobile phone, a PDA, a gaming device, a digital camera, a video camera, a video player, or other mobile terminal device, or as the display device of a notebook-type personal computer, a cash dispenser, a vending machine, or other terminal device.

What is claimed is:

1. A light source device comprising:
   a planar light source that emits light in planar form;
   a transparent/scattering switching element switchable between a transparent state in which light emitted from the planar light source is transmitted and a scattering state in which the light is scattered; and
   a control unit for controlling said planar light source and said transparent/scattering switching element; wherein during switching of the state of said transparent/scattering switching element, said control unit changes the chromaticity of the light emitted from said planar light source so as to reduce chromaticity change of light emitted from said transparent/scattering state switching element.

2. The light source device according to claim 1, wherein said control unit controls said planar light source so that the following equations are satisfied when the state of said transparent/scattering switching element is switched:

$(xptd-xpt) \times (xt-xd) > 0$ $(yptd-ypt) \times (yt-yd) > 0$ $(xptd-xpt)^2 + (yptd-ypt)^2 > (xpd-xpt)^2 + (ypd-ypt)^2$ where the chromaticity coordinates of light emitted from said planar light source when said transparent/scattering switching element is brought to the transparent state are designated as (xt, yt);

the chromaticity coordinates of light emitted from said transparent/scattering switching element are designated as (xpt, ypt);

the chromaticity coordinates of light emitted from said transparent/scattering switching element when light having chromaticity coordinates (xt, yt) enters said transparent/scattering switching element while in said scattering state are designated as (xptd, yptd);

the chromaticity coordinates of light emitted from said planar light source when said transparent/scattering switching element is in said scattering state are designated as (xd, yd); and the chromaticity coordinates of light emitted from said transparent/scattering switching element at the time are designated as (xpd, ypd).

3. The light source device according to claim 1, wherein said planar light source has a first light source, and a second light source that emits light whose chromaticity coordinates are different from the chromaticity coordinates of the light emitted from said first light source; and wherein said control unit varies the proportion of the quantity of light emitted from said first light source and the quantity of light emitted from said second light source, so that when said transparent/scattering switching element is in said scattering state, the proportion is different from that in said transparent state.

4. The light source device according to claim 3, wherein the chromaticity coordinate values of light emitted from said second light source are smaller than the chromaticity coordinate values of light emitted from said first light source; and said control unit, when said transparent/scattering switching element is switched from said transparent state to said scattering state, increases the quantity of light of said second light source so that the proportion of change in the quantity of light of said second light source is greater than the proportion of change in the quantity of light of said first light source.

5. The light source device according to claim 3, wherein each of the first and second light sources is a light-emitting diode.

6. The light source device according to claim 5, wherein each of said light-emitting diodes has:
a blue light-emitting diode that emits blue light; and
a yellow phosphor that emits yellow light by excitation with said blue light.

7. The light source device according to claim 6, wherein the quantity of light of said light-emitting diode is adjusted by pulse modulation.

8. The light source device according to claim 5, wherein each of said light-emitting diodes has:
an ultraviolet light-emitting diode that emits ultraviolet light;
a red phosphor that emits red light by excitation with said ultraviolet light;
a green phosphor that emits green light by excitation with said ultraviolet light; and
a blue phosphor that emits blue light by excitation with said ultraviolet light.

9. The light source device according to claim 5, wherein said planar light source has a light-guide plate for receiving light emitted from said first and second light sources, and emitting the light in planar form.

10. The light source device according to claim 9, wherein a plurality of said first light sources and a plurality of said second light sources are arranged in alternating fashion.

11. The light source device according to claim 10, wherein said plurality of first light sources are mutually connected in series, and said plurality of second light sources are mutually connected in series.

12. The light source device according to claim 11, wherein the number of said first light sources and the number of said second light sources are mutually equal.

13. The light source device according to claim 11, wherein the wiring terminals of said first light sources and the wiring terminals of said second light sources are partially shared.

14. The light source device according to claim 9, wherein a single said first light source and a single said second light source are provided; and
one corner of said light-guide plate is cut off to form a single inclined surface, with said first and second light sources positioned at locations facing said inclined surface.

15. The light source device according to claim 5, wherein said planar light source has:
a first light-guide plate for receiving light emitted from said first light source and emitting the light in planar form; and
a second light-guide plate which, when viewed from the first light-guide plate, is disposed on said transparent/scattering switching element side or on the opposite side therefrom, and which receives light emitted from said second light source and emits the light in planar form.

16. The light source device according to claim 15, wherein said first light source and said second light source, viewed in the direction looking toward said planar light source from said transparent/scattering switching element, are positioned in the same location relative to each other.

17. The light source device according to claim 5, wherein said first and second light sources are housed in mutually different packages.

18. The light source device according to claim 3, wherein each of said first and second light sources is a cold cathode fluorescent lamp.

19. The light source device according to claim 18, wherein said planar light source has a light-guide plate for receiving light emitted from said first and second light source and emitting the light in planar form.

20. The light source device according to claim 1, further comprising: a light direction regulating element for regulating a direction of light emitted from said planar light source and emitting the light to said transparent/scattering switching element.

21. A display device comprising the light source device according to claim 1, and a transmissive display panel for transmitting light emitted from the light source device, whereby an image is superimposed on the light.

22. The display device according to claim 21, wherein said transmissive display panel is a liquid crystal panel.

23. The display device according to claim 22, wherein said liquid crystal panel is a horizontal field mode, multi-domain vertical alignment mode, or film-compensated TN mode liquid crystal panel.

24. A terminal device comprising the display device according to claim 21.

25. The terminal device according to claim 24, wherein the device is a mobile phone, a personal information terminal, a gaming device, a digital camera, a video camera, a video player, a notebook-type personal computer, a cash dispenser, or a vending machine.

26. A light source unit comprising:
a planar light source that emits light in planar form; and
a transparent/scattering switching element switchable between a transparent state in which light emitted from the planar light source is transmitted and a scattering state in which the light is scattered; wherein
during switching of the state of said transparent/scattering switching element, the chromaticity of light emitted from said planar light source is changed so as to reduce chromaticity change of the light emitted from said transparent/scattering state switching element.

27. The light source unit according to claim 26, wherein said planar light source satisfies the following equations when the state of said transparent/scattering switching element is switched:

$(xptd-xpt) \times (xt-xd) > 0$ $(yptd-ypt) \times (yt-yd) > 0$ $(xptd-xpt)^2 + (yptd-ypt)^2 > (xpd-xpt)^2 + (ypd-ypt)^2$ where the chromaticity coordinates of light emitted from said planar light source when said transparent/scattering switching element is brought to the transparent state are designated as (xt, yt);
the chromaticity coordinates of light emitted from said transparent/scattering switching element are designated as (xpt, ypt);
the chromaticity coordinates of light emitted from said transparent/scattering switching element when light having chromaticity coordinates (xt, yt) enters said transparent/scattering switching element while in said scattering state are designated as (xptd, yptd);
the chromaticity coordinates of light emitted from said planar light source when said transparent/scattering switching element is in said scattering state are designated as (xd, yd); and
the chromaticity coordinates of light emitted from said transparent/scattering switching element at the time are designated as (xpd, ypd).

28. The light source unit according to claim 26, wherein said planar light source has:
a first light source; and
a second light source that emits light whose chromaticity coordinates are different from the chromaticity coordinates of the light emitted from said first light source, and wherein
with said transparent/scattering switching element in said scattering state, the proportion of the quantity of light emitted from said first light source and the quantity of light emitted from said second light source differs from that in said transparent state.

29. The light source unit according to claim 28, wherein the chromaticity coordinate values of the light emitted from said second light source are smaller than the chromaticity coordinate values of the light emitted from said first light source; and wherein
when said transparent/scattering switching element switches from said transparent state to said scattering state, the quantity of light of said second light source is increased so that the proportion of change in the quantity of light of said second light source is greater than the proportion of change in the quantity of light of said first light source.

30. The light source unit according to claim 28, wherein each of the first and second light sources is a light-emitting diode.

31. The light source unit according to claim 30, wherein each of said light-emitting diodes has:
a blue light-emitting diode that emits blue light; and
a yellow phosphor that emits yellow light by excitation with said blue light.

32. The light source unit according to claim 31, wherein the quantity of light of said light-emitting diode is adjusted by pulse modulation.

33. The light source unit according to claim 30, wherein each of said light-emitting diodes has:
an ultraviolet light-emitting diode that emits ultraviolet light;
a red phosphor that emits red light by excitation with said ultraviolet light;
a green phosphor that emits green light by excitation with said ultraviolet light; and
a blue phosphor that emits blue light by excitation with said ultraviolet light.

34. The light source unit according to claim 30, wherein said planar light source has a light-guide plate for receiving light emitted from said first and second light sources and emitting the light in planar form.

35. The light source unit according to claim 34, wherein a plurality of said first light sources and a plurality of said second light sources are arranged in alternating fashion.

36. The light source unit according to claim 35, wherein said plurality of first light sources are mutually connected in series; and
said plurality of second light sources are mutually connected in series.

37. The light source unit according to claim 36, wherein the number of said first light sources and the number of said second light sources are mutually equal.

38. The light source unit according to claim 36, wherein the wiring terminals of said first light sources and the wiring terminals of said second light sources are partially shared.

39. The light source unit according to claim 34, wherein
a single said first light source and a single said second light source are provided; and
one corner of said light-guide plate is cut off to form a single inclined surface, with said first and second light sources positioned at locations facing said inclined surface.

40. The light source unit according to claim 30, wherein said planar light source has:
a first light-guide plate for receiving light emitted from said first light source and emitting the light in planar form; and
a second light-guide plate which, when viewed from the first light-guide plate, is disposed on said transparent/scattering switching element side or on the opposite side therefrom, and which receives light emitted from said second light source and emits the light in planar form.

41. The light source unit according to claim 40, wherein said first light source and said second light source, viewed in the direction looking toward said planar light source from said transparent/scattering switching element, are positioned in the same location in relation to each other.

42. The light source unit according to claim 30, wherein said first and second light sources are housed in mutually different packages.

43. The light source unit according to claim 28, wherein each of said first and second light sources is a cold cathode fluorescent lamp.

44. The light source unit according to claim 43, wherein said planar light source has a light-guide plate for receiving light emitted from said first and second light source, and emitting the light in planar form.

45. The light source unit according to claim 26, further comprising: a light direction regulating element for regulating a direction of light emitted from said planar light source and emitting the light to said transparent/scattering switching element.

46. A method for driving a light source device, comprising the steps of:
   transmitting first light from a planar light source that emits light in planar form, and switching to a transparent state a transparent/scattering switching element switchable between a transparent state in which light emitted from the planar light source is transmitted, and a scattering state in which the light is scattered; and
   causing said planar light source to emit second light whose chromaticity differs from the chromaticity of said first light, and switching said transparent/scattering switching element to said scattering state; wherein
   the chromaticity of said second light is set so as to reduce chromaticity change of light emitted from said transparent/scattering switching element during a transition from said transparent step or said scattering step to the other.

47. The method for driving a light source device according to claim 46, wherein said planar light source is controlled so that the following equations are satisfied during transition from said transparent step or said scattering step to the other:

$$(xptd-xpt) \times (xt-xd) > 0$$

$$(yptd-ypt) \times (yt-yd) > 0$$

$$(xptd-xpt)^2 + (yptd-ypt)^2 > (xpd-xpt)^2 + (ypd-ypt)^2$$

where the chromaticity coordinates of light emitted from said planar light source when said transparent/scattering switching element is in the transparent state are designated as (xt, yt);
   the chromaticity coordinates of light emitted from said transparent/scattering switching element are designated as (xpt, ypt);
   the chromaticity coordinates of light emitted from said transparent/scattering switching element when light having chromaticity coordinates (xt, yt) enters said transparent/scattering switching element while in said scattering state are designated as (xptd, yptd);
   the chromaticity coordinates of light emitted from said planar light source when said transparent/scattering switching element is in said scattering state are designated as (xd, yd); and
   the chromaticity coordinates of light emitted from said transparent/scattering switching element at the time are designated as (xpd, ypd).

48. The method for driving a light source device according to claim 46, wherein said planar light source has:
   a first light source; and
   a second light source that emits light whose chromaticity coordinates are different from the chromaticity coordinates of the light emitted from said first light source; wherein
   the proportion of the quantity of light emitted from said first light source and the quantity of light emitted from said second light source is mutually different between said scattering state and said transparent state.

49. The method for driving a light source device according to claim 48, wherein
   the chromaticity coordinate values of the light emitted from said second light source are smaller than the chromaticity coordinate values of the light emitted from said first light source; and
   during transition from said transparent state to said scattering state, the quantity of light of said second light source increases so that the proportion of change in the quantity of light of said second light source is greater than the proportion of change in the quantity of light of said first light source.

* * * * *